United States Patent
Furuta

(10) Patent No.: US 10,531,037 B2
(45) Date of Patent: Jan. 7, 2020

(54) SOLID-STATE ELECTRONIC IMAGING DEVICE AND METHOD FOR CONTROLLING THE SAME

(71) Applicant: FUJIFILM Corporation, Tokyo (JP)

(72) Inventor: Yoshinori Furuta, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/190,713

(22) Filed: Nov. 14, 2018

(65) Prior Publication Data

US 2019/0082135 A1    Mar. 14, 2019

Related U.S. Application Data

(63) Continuation of application No. PCT/JP2017/014926, filed on Apr. 12, 2017.

(30) Foreign Application Priority Data

May 25, 2016 (JP) ................................ 2016-104406

(51) Int. Cl.
H04N 5/378    (2011.01)
H04N 5/357    (2011.01)
H04N 5/374    (2011.01)

(52) U.S. Cl.
CPC ............. *H04N 5/378* (2013.01); *H04N 5/357* (2013.01); *H04N 5/374* (2013.01)

(58) Field of Classification Search
CPC .... H04N 5/357; H04N 5/3575; H04N 5/3577; H04N 5/374; H04N 5/378; H04N 5/3765; H04N 5/3658; H04N 5/3745; H04N 9/045

See application file for complete search history.

(56) References Cited

U.S. PATENT DOCUMENTS

2007/0018875 A1    1/2007  Shoji et al.
2008/0180541 A1    7/2008  Yonemitsu
(Continued)

FOREIGN PATENT DOCUMENTS

JP    2007-36425 A    2/2007
JP    2008-60872 A    3/2008
(Continued)

OTHER PUBLICATIONS

International Preliminary Report on Patentability and Written Opinion of the International Searching Authority (forms PCT/IB/373, PCT/ISA/237 and PCT/IB/326), dated Dec. 6, 2018, for corresponding International Application No. PCT/JP2017/014926, with a Written Opinion translation.

(Continued)

*Primary Examiner* — Chiawei Chen
(74) *Attorney, Agent, or Firm* — Birch, Stewart, Kolasch & Birch, LLP

(57) ABSTRACT

Provided are a solid-state electronic imaging device that makes periodic noise invisible and a method for controlling the solid-state electronic imaging device. In a solid-state electronic imaging device in which a plurality of photoelectric conversion elements are arranged, a second ramp wave whose level decreases for a second sampling period from the output of a read pulse for reading signal charge accumulated in the photoelectric conversion elements to the output of a reset pulse for resetting the signal charge accumulated in the photoelectric conversion elements is output. In a case in which the level of the second ramp wave is a second reference level, a second sampling pulse is output and a voltage signal converted from the signal charge is sampled. The sampling interval is non-periodic. Even in a case in which periodic noise has an effect on the solid-state elec- (Continued)

tronic imaging device, it is possible to exclude the periodic noise from an object image obtained by imaging.

13 Claims, 18 Drawing Sheets

(56) References Cited

U.S. PATENT DOCUMENTS

| | | | | |
|---|---|---|---|---|
| 2010/0140732 A1* | 6/2010 | Eminoglu | ......... | H01L 27/14634 257/447 |
| 2011/0019025 A1 | 1/2011 | Koseki | | |
| 2012/0113306 A1* | 5/2012 | Dai | ...................... | H04N 5/3742 348/308 |
| 2014/0117204 A1* | 5/2014 | Ha | ...................... | H04N 5/3559 250/208.1 |
| 2014/0118583 A1* | 5/2014 | Shida | ................... | H04N 5/3765 348/250 |
| 2015/0303937 A1* | 10/2015 | Gou | ...................... | H04N 5/378 250/208.1 |
| 2016/0182845 A1* | 6/2016 | Hagihara | ................ | H03M 1/12 348/301 |
| 2016/0360138 A1* | 12/2016 | Meynants | ......... | H01L 27/14609 |
| 2017/0237914 A1* | 8/2017 | Cho | ...................... | H04N 5/3575 348/241 |
| 2017/0280077 A1* | 9/2017 | Yun | ................... | H01L 27/14609 |
| 2017/0318247 A1* | 11/2017 | Kim | ....................... | H04N 5/378 |
| 2018/0041722 A1* | 2/2018 | Barnes | .................. | H04N 5/378 |
| 2018/0176493 A1* | 6/2018 | Spivak | ................. | H04N 5/3745 |

FOREIGN PATENT DOCUMENTS

| | | |
|---|---|---|
| JP | 2008-187511 A | 8/2008 |
| JP | 2012-239650 A | 12/2012 |
| JP | 2014-90325 A | 5/2014 |

OTHER PUBLICATIONS

International Search Report (form PCT/ISA/210), dated Jul. 4, 2017, for corresponding International Application No. PCT/JP2017/014926, with an English translation.

* cited by examiner

SOLID-STATE ELECTRONIC IMAGING DEVICE AND METHOD FOR CONTROLLING THE SAME

CROSS-REFERENCE TO RELATED APPLICATIONS

This application is a Continuation of PCT International Application No. PCT/JP2017/014926 filed on Apr. 12, 2017, which claims priority under 35 U.S.C. § 119(a) to Japanese Patent Application No. 2016-104406 filed on May 25, 2016. Each of the above application(s) is hereby expressly incorporated by reference, in its entirety, into the present application.

BACKGROUND OF THE INVENTION

1. Field of the Invention

The present invention relates to a solid-state electronic imaging device and a method for controlling the same.

2. Description of the Related Art

For example, in a complementary metal oxide semiconductor (CMOS) solid-state electronic imaging element or a charge coupled device (CCD) solid-state electronic imaging element, a photodiode is exposed and signal charge is accumulated in the photodiode. The signal charge accumulated in the photodiode is converted into an analog signal (voltage signal) and the converted analog signal is sampled to obtain a video signal. The obtained video signal is likely to be distorted due to various factors. For this reason, the timing of a timing pulse of a correlated double sampling (CDS) circuit is adjusted (JP2012-239650A). In addition, there is a technique which delays the phase of a video signal processing clock in order to prevent beat noise caused by the mixture of a clock of a microcomputer with a video synchronizing clock (JP2008-187511A). Furthermore, there is a technique which prevents the mixture of noise generated by the driving of a digital circuit with an analog signal (JP2007-036425A).

SUMMARY OF THE INVENTION

FIG. 17 illustrates periodic noise (cyclic noise), a horizontal synchronizing signal HD (horizontal driving signal), a ramp wave without noise (reference signal), a ramp wave with periodic noise (reference signal), and a variation in a signal caused by periodic noise (a variation in a video signal). In a case in which no periodic noise is included in the ramp wave, at a time ts1 when the ramp wave is at a predetermined level, an analog signal obtained by converting the signal charge accumulated in a photodiode is sampled and a video signal is obtained. In a case in which no periodic noise is included in the ramp wave, the obtained video signal is not affected by noise. However, in a case in which periodic noise is included in the ramp wave, the time when the ramp wave is at the predetermined level is shifted from the time ts1 to a time ts2. At the time ts2, an analog signal obtained by converting the signal charge accumulated in the photodiode is sampled and the signal varies periodically due to the periodic noise. The variation in the periodic signal causes the periodic noise in a captured image to be visible. FIG. 18 illustrates an example of an object image 110 in which periodic noise appears. A beat-shaped line appears as noise 111 in the vertical direction of the object image 110 due to the periodic noise. A technique that makes the noise 111 invisible is not considered in any of JP2012-239650A, JP2008-187511A, and JP2007-036425A.

An object of the invention is to make periodic noise invisible.

A solid-state electronic imaging device according to the invention comprises: a plurality of photoelectric conversion elements that are arranged in a row direction and a column direction; a pulse output circuit that outputs a reset pulse for resetting signal charge accumulated in the photoelectric conversion elements after a periodic horizontal synchronizing signal (horizontal driving signal) is output and outputs a read pulse for reading the signal charge accumulated in the photoelectric conversion elements; an amplification circuit that converts the signal charge accumulated in the photoelectric conversion elements into an analog signal and outputs the analog signal, in response to the output of the read pulse from the pulse output circuit; a reference signal output circuit that outputs a first reference signal whose level increases or decreases for a first sampling period from the output of the reset pulse from the pulse output circuit to the output of the read pulse from the pulse output circuit and outputs a second reference signal whose level increases or decreases for a second sampling period from the output of the read pulse from the pulse output circuit to the output of the reset pulse from the pulse output circuit; a first sampling circuit that samples the analog signal output from the amplification circuit in a case in which the level of the first reference signal output from the reference signal output circuit is a first reference level; a second sampling circuit that samples the analog signal output from the amplification circuit in a case in which the level of the second reference signal output from the reference signal output circuit is a second reference level; and a sampling control device (sampling control means) for making at least one of the sampling of the analog signal by the first sampling circuit for the first sampling period or the sampling of the analog signal by the second sampling circuit for the second sampling period non-periodic.

The invention also provides a control method suitable for the solid-state electronic imaging device. That is, the method comprises: allowing a pulse output circuit to output a reset pulse for resetting signal charge accumulated in a plurality of photoelectric conversion elements that are arranged in a row direction and a column direction after a periodic horizontal synchronizing signal is output and to output a read pulse for reading the signal charge accumulated in the photoelectric conversion elements; allowing an amplification circuit to convert the signal charge accumulated in the photoelectric conversion elements into an analog signal and to output the analog signal, with the output of the read pulse from the pulse output circuit; allowing a reference signal output circuit to output a first reference signal whose level increases or decreases for a first sampling period from the output of the reset pulse from the pulse output circuit to the output of the read pulse from the pulse output circuit and to output a second reference signal whose level increases or decreases for a second sampling period from the output of the read pulse from the pulse output circuit to the output of the reset pulse from the pulse output circuit; allowing a first sampling circuit to sample the analog signal output from the amplification circuit in a case in which the level of the first reference signal output from the reference signal output circuit is a first reference level; allowing a second sampling circuit to sample the analog signal output from the amplification circuit in a case in which the level of the second reference signal output from the reference signal output circuit is a second reference level; and an allowing sampling control device (allowing sampling control means) to make at least one of the sampling of the analog signal by the first sampling circuit for the first sampling period or the sampling of the analog signal by the second sampling circuit for the second sampling period non-periodic.

For example, the sampling control device makes at least one of an output timing of the first reference signal from the reference signal output circuit or an output timing of the second reference signal from the reference signal output circuit non-periodic such that at least one of the sampling of the analog signal for the first sampling period or the sampling of the analog signal for the second sampling period is non-periodic.

The sampling control device may non-periodically change at least one of the first reference level or the second reference level such that at least one of the sampling of the analog signal for the first sampling period or the sampling of the analog signal for the second sampling period is non-periodic.

A sampling interval between the sampling of the analog signal for the first sampling period and the sampling of the analog signal for the second sampling period may be constant.

A sampling interval between the sampling of the analog signal for the first sampling period and the sampling of the analog signal for the second sampling period may vary depending on a period of the horizontal synchronizing signal.

The solid-state electronic imaging device may further comprise: a difference circuit that outputs a difference analog signal indicating a difference between a first analog signal obtained by the sampling in the first sampling circuit and a second analog signal obtained by the sampling in the second sampling circuit.

The solid-state electronic imaging device may further comprise a periodic noise determination device (periodic noise determination means) for determining whether an amount of periodic noise included in an object image that is indicated by the difference analog signal output from the difference circuit is equal to or greater than a predetermined value. In a case in which the periodic noise determination device determines that the amount of periodic noise included in the object image is equal to or greater than the predetermined value, the sampling control device shifts at least one of an amount of shift from an output timing of the horizontal synchronizing signal to the sampling of the analog signal for the first sampling period or an amount of shift from the output timing of the horizontal synchronizing signal to the sampling of the analog signal for the second sampling period by a set value or more.

The solid-state electronic imaging device may further comprise: a comparison device (comparison means) for comparing first periodic noise that is included in an object image indicated by a difference analog signal output from the difference circuit in a case in which the sampling control device performs a first sampling process that makes at least one of the output timing of the first reference signal from the reference signal output circuit or the output timing of the second reference signal from the reference signal output circuit non-periodic such that at least one of the sampling of the analog signal for the first sampling period or the sampling of the analog signal for the second sampling period is non-periodic with second periodic noise that is included in an object image indicated by a difference analog signal output from the difference circuit in a case in which the sampling control device performs a second sampling process that non-periodically changes at least one of the first reference level or the second reference level such that at least one of the sampling of the analog signal for the first sampling period or the sampling of the analog signal for the second sampling period is non-periodic; and the control device (control means) for directing the sampling control device to perform the first sampling process in a case in which the comparison device determines that the second periodic noise is more than the first periodic noise and directing the sampling control device to perform the second sampling process in a case in which the comparison device determines that the first periodic noise is more than the second periodic noise.

The solid-state electronic imaging device may further comprise a driving circuit that generates the horizontal synchronizing signal and outputs the horizontal synchronizing signal to the pulse output circuit.

For example, an increase or decrease in the first reference signal is repeated for the first sampling period.

For example, an increase or decrease in the second reference signal is repeated for the second sampling period.

For example, the first reference signal is output after a first predetermined period elapses since the output of the reset pulse and the second reference signal is output after a second predetermined period elapses since the output of the reset pulse. In this case, preferably, the sampling control device makes the output timing of the reset pulse from the pulse output circuit non-periodic.

The signal charge accumulated in the photoelectric conversion element is reset by the reset pulse synchronized with the horizontal synchronizing signal and is read by the read pulse. The signal charge read from the photoelectric conversion element is converted into an analog signal by the amplification circuit. The first reference signal whose level increases or decreases for the first sampling period from the output of the reset pulse to the output of the read pulse is output and the second reference signal whose level increases or decreases for the second sampling period from the output of the read pulse to the output of the reset pulse is output. The analog signal output from the amplification circuit in a case in which the level of the first reference signal is the first reference level is sampled. The analog signal output from the amplification circuit in a case in which the level of the second reference signal is the second reference level is sampled. A difference signal between two analog signals obtained by two sampling processes indicates a video signal. According to the invention, at least one of the sampling of the analog signal for the first sampling period or the sampling of the analog signal for the second sampling period is non-periodic. As such, since the sampling is non-periodic, the generation of periodic noise in the image (object image) indicated by the obtained video signal is prevented. As a result, the periodic noise is invisible.

BRIEF DESCRIPTION OF THE DRAWINGS

FIG. 4 is a timing chart illustrating a horizontal synchronizing signal HD, a reset pulse and the like.

FIG. 5 is a timing chart illustrating the output timing of a ramp wave and the like.

FIG. 17 is a timing chart illustrating periodic noise, a horizontal synchronizing signal HD, and the like.

DESCRIPTION OF THE PREFERRED EMBODIMENTS

Figure 1:
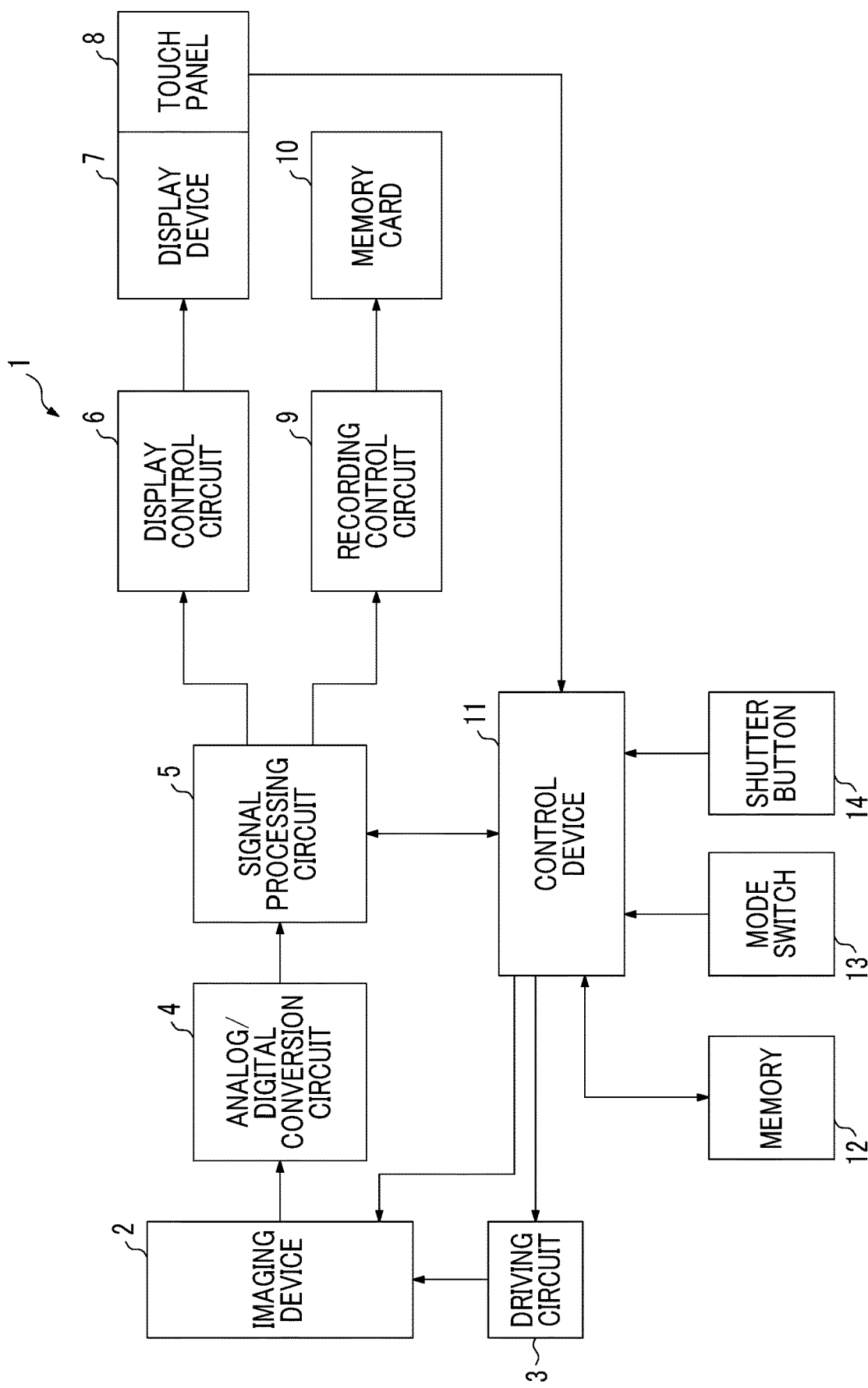
FIG. 1 is a block diagram illustrating the electric configuration of a digital camera.

FIG. 1 illustrates an embodiment of the invention and is a block diagram illustrating the electric configuration of a digital camera 1.

The overall operation of the digital camera 1 is controlled by a control device 11.

The digital camera 1 includes an imaging device 2 (solid-state electronic imaging device) that is controlled by the control device 11 and is driven by a driving circuit 3. In a case in which the driving circuit 3 drives the imaging device 2, the imaging device 2 captures an image of an object and a video signal indicating the object image is output from the imaging device 2. The video signal output from the imaging device 2 is input to an analog/digital conversion circuit 4. The analog/digital conversion circuit 4 converts the video signal into digital image data.

The digital image data is input to a signal processing circuit 5 and predetermined signal processing, such as gamma correction or white balance adjustment, is performed for the digital image data. The digital image data output from the signal processing circuit 5 is transmitted to a display control circuit 6. The object image is displayed on a display screen of a display device 7 under the control of the display control circuit 6.

In a case in which a shutter button 14 is pressed, a shutter release signal is input to the control device 11. Then, as described above, the imaging device 2 captures the image of the object and the video signal indicating the object image is output from the imaging device 2. The analog/digital conversion circuit 4 converts the video signal into digital image data and the signal processing circuit 5 performs predetermined signal processing for the digital image data. The digital image data output from the signal processing circuit 5 is input to a recording control circuit 9. The recording control circuit 9 records the digital image data on a memory card 10.

The digital camera 1 is provided with a mode switch 13 that sets various imaging modes. An imaging mode setting signal output from the mode switch 13 is input to the control device 11.

A touch panel 8 is formed on the display screen of the display device 7. In a case in which the touch panel 8 is operated, signals indicating various commands are generated and the command signals are input to the control device 11. In addition, a memory 12 that stores predetermined data is connected to the control device 11.

Figure 2:
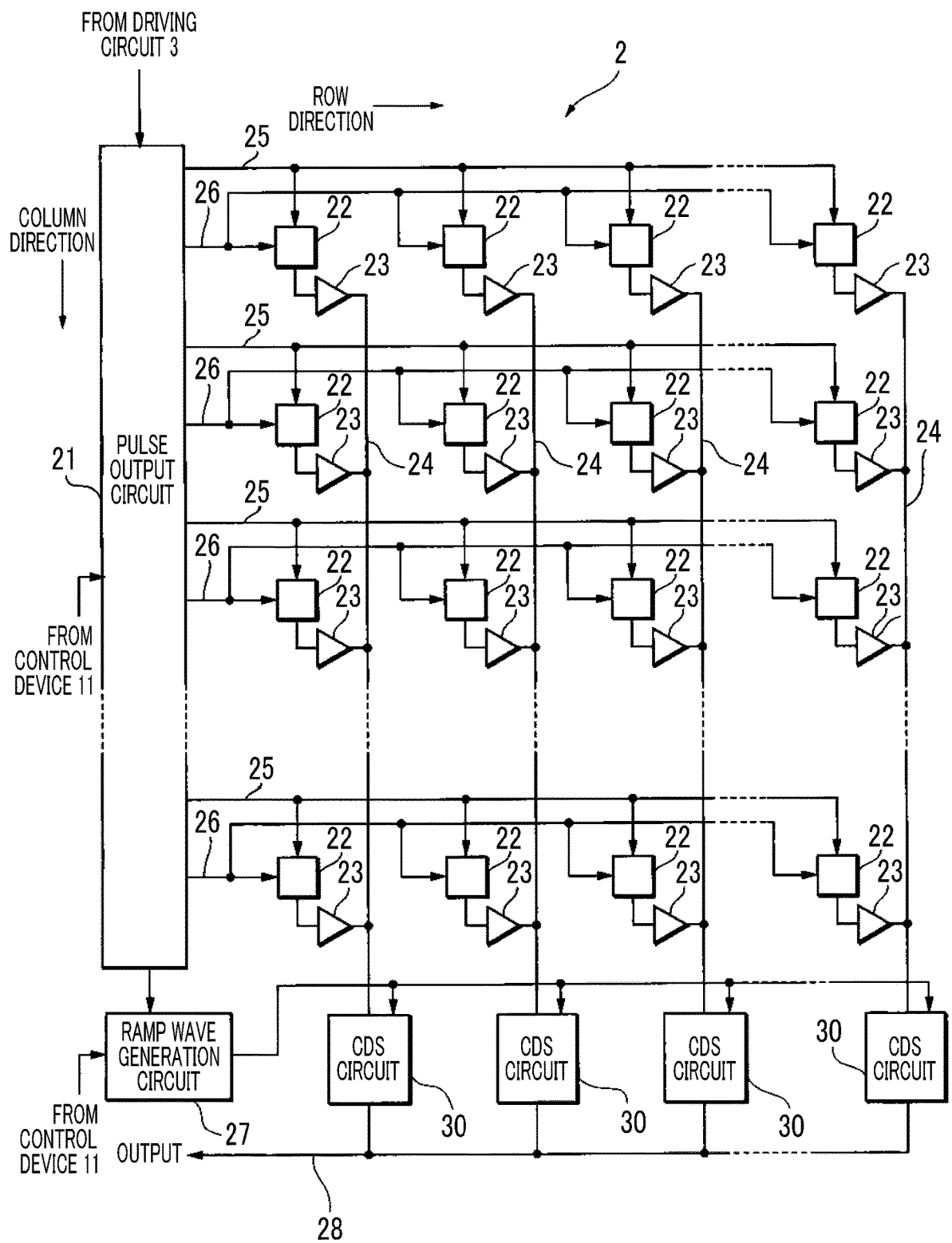
FIG. 2 is a block diagram illustrating the electric configuration of an imaging device.

FIG. 2 is a block diagram illustrating the electric configuration of the imaging device 2.

The imaging device 2 illustrated in FIG. 2 is a complementary metal oxide semiconductor (CMOS) imaging device 2. The imaging device 2 may be a charge coupled device (CCD) type.

In the imaging device 2, a plurality of photoelectric conversion elements (photodiodes) 22 are arranged in a row direction (horizontal direction) and a column direction (vertical direction). A floating diffusion amplifier (FDA) 23 (amplification circuit) is connected to the photoelectric conversion element 22. The FDAs 23 in each column are connected to a common vertical signal line 24 in each column. A correlated double sampling (CDS) circuit 30 is connected to each vertical signal line 24. An output of the CDS circuit 30 is connected to an output line 28. The imaging device 2 includes a ramp wave generation circuit (a reference signal generation circuit or a sawtooth wave generation circuit) 27.

A common reset pulse line 25 and a common read pulse line 26 in each row are connected to the photoelectric conversion elements 22 in each row.

The driving circuit 3 outputs a horizontal synchronizing signal HD (a horizontal synchronizing signal or a horizontal driving pulse) to the imaging device 2. The horizontal synchronizing signal HD is input to a pulse output circuit 21. Then, the pulse output circuit 21 outputs a reset pulse synchronized with the horizontal synchronizing signal HD to each reset pulse line 25. In addition, the pulse output circuit 21 outputs a read pulse synchronized with the horizontal synchronizing signal HD to each read pulse line 26. The reset pulse is a pulse for resetting signal charge accumulated in the photoelectric conversion element 22 and is synchronized with the periodic horizontal synchronizing signal HD. The read pulse is a pulse for reading the signal charge accumulated in the photoelectric conversion element.

In a case in which the pulse output circuit 21 outputs the reset pulse to each reset pulse line 25, the reset pulse is applied to the photoelectric conversion elements 22 in the same row which are connected to the reset pulse line 25 to which the reset pulse has been output. Then, the photoelectric conversion elements 22 in the same row, to which the reset pulse has been applied, are reset and signal charge accumulated in the photoelectric conversion elements 22 is swept out (for example, unnecessary charge is swept out from a substrate). In a case in which the pulse output circuit 21 outputs the read pulse to each read pulse line 26, the signal charge accumulated in the photoelectric conversion elements 22 in the same row connected to the read pulse line 26, to which the read pulse has been output, is transmitted to the FDA 23. The video signal is changed into an analog signal (voltage signal) by the FDA 23 and is transmitted to the vertical signal line 24. The analog signal is input to the CDS circuit 30 connected to the vertical signal line 24. The FDA 23 is an amplification circuit that converts the signal charge accumulated in the photoelectric conversion element 22 into an analog signal and outputs the analog signal, with the output of the read pulse from the pulse output circuit 21.

The reset pulse output from the pulse output circuit 21 is also input to the ramp wave generation circuit 27. In a case in which the reset pulse is input to the ramp wave generation circuit 27, the ramp wave generation circuit 27 outputs a first ramp wave W1 and a second ramp wave W2 (see FIG. 4) and the first ramp wave W1 and the second ramp wave W2 are input to the CDS circuit 30, which will be described in detail below. The CDS circuit 30 calculates a difference signal between an analog signal input to the CDS circuit 30 at the time when the first ramp wave W1 is at a first reference level and an analog signal input to the CDS circuit 30 at the time when the second ramp wave W2 is at a second reference level. The CDS circuit 30 outputs the calculated difference signal as a video signal to the imaging device 2 through the output line 28.

The reset pulse and the read pulse are transmitted to each of the photoelectric conversion elements 22 in each row and the video signal indicating the object image for each row is output from the imaging device 2. The reset pulse and the read pulse are sequentially output from the pulse output circuit 21 in the column direction or a direction opposite to the column direction.

Figure 3:
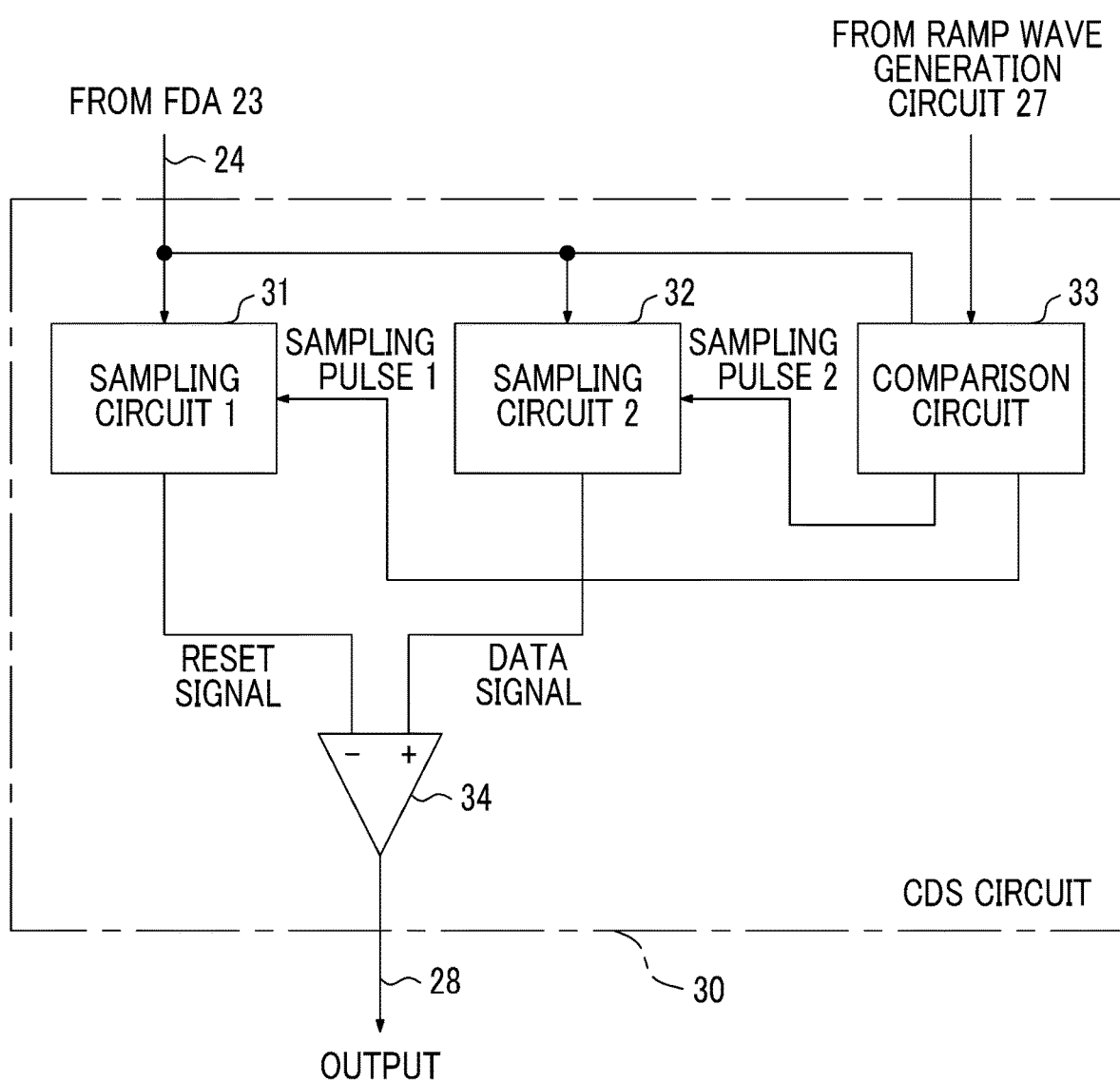
FIG. 3 is a block diagram illustrating the electric configuration of a CDS circuit.
Figure 4:
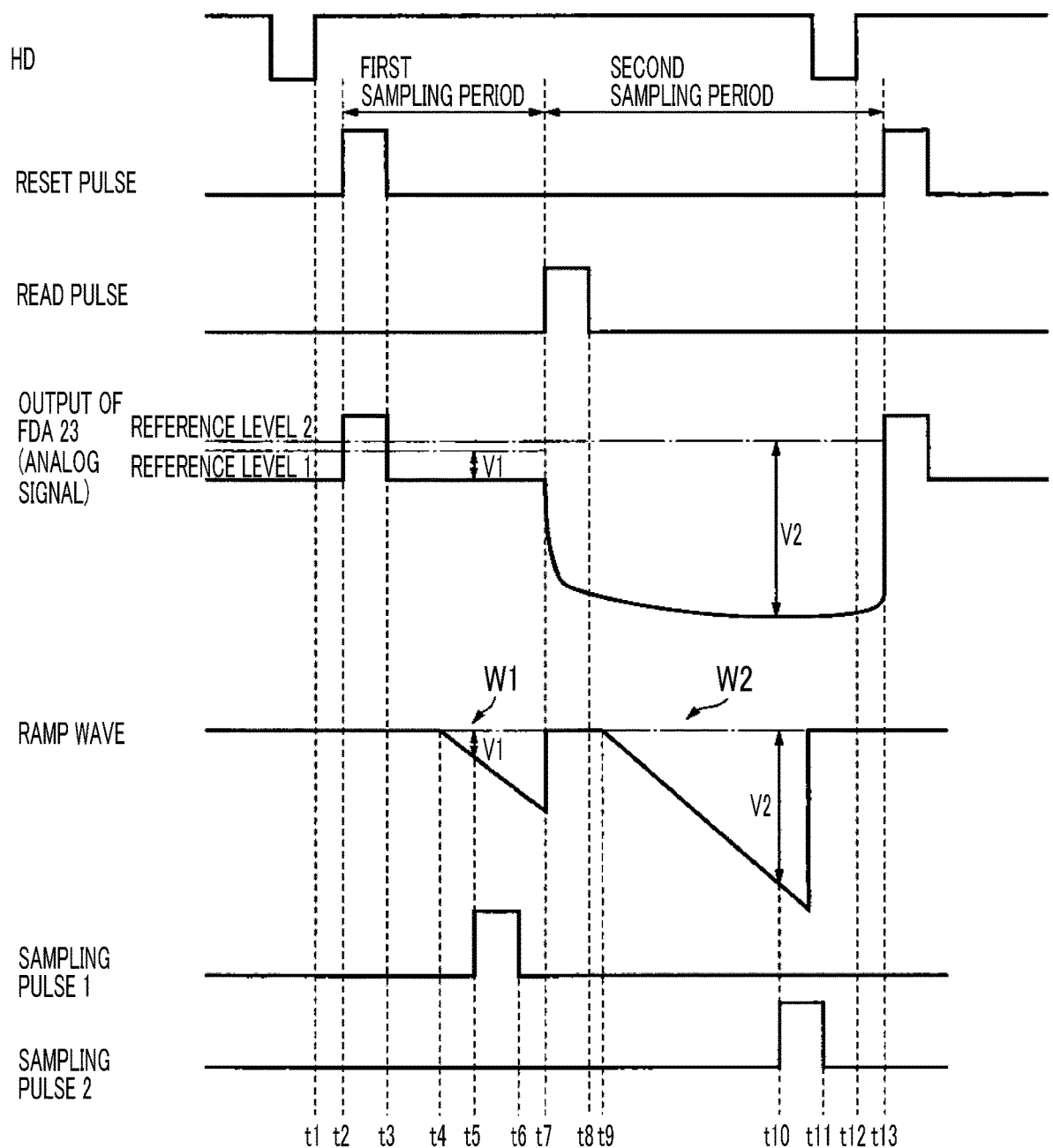

FIG. 3 is a block diagram illustrating the electric configuration of the CDS circuit 30. FIG. 4 is a timing chart illustrating signals that flow through, for example, circuits forming the CDS circuit 30.

In a case in which the horizontal synchronizing signal HD is input to the pulse output circuit 21 and the horizontal synchronizing signal HD rises at a time t1, the pulse output circuit 21 outputs the reset pulse for a period from a time t2 to a time t3 after the output of the horizontal synchronizing signal HD. The reset pulse is transmitted to the photoelectric conversion element 22 and unnecessary signal charge accumulated in the photoelectric conversion element 22 is swept out. In a case in which a first predetermined period elapses since the output of the reset pulse and a time t4 comes, the ramp wave generation circuit 27 (reference signal output circuit) outputs the first ramp wave (first reference signal) W1. The first ramp wave W1 is input to a comparison circuit 33 included in the CDS circuit 30. The level of the first ramp wave W1 decreases (may increase) to a predetermined level over time.

The analog signal that has been output from the FDA 23 and input to the CDS circuit 30 is input to a first sampling circuit 31, a second sampling circuit 32, and the comparison circuit 33. The comparison circuit 33 compares the level of the analog signal output from the FDA 23 with the level of the first ramp wave W1 output from the ramp wave generation circuit 27. In a case in which the level of the first ramp wave W1 is equal to a first reference level V1 that has been set in advance in the comparison circuit 33 at a time t5, the comparison circuit 33 outputs a first sampling pulse for a period from the time t5 to a time t6. The first sampling pulse is input to the first sampling circuit 31 and the analog signal input to the first sampling circuit 31 is sampled by the first sampling circuit 31. The signal sampled by the first sampling circuit 31 is output as a reset signal (first analog signal) from the first sampling circuit 31 and is input to a negative input terminal of a difference circuit 34.

In a case in which a second predetermined period elapses since the output of the reset pulse and a time t7 comes, the pulse output circuit 21 outputs the read pulse. It is assumed that the period from the output of the reset pulse by the pulse output circuit 21 to the output of the read pulse by the pulse output circuit 21 is a first sampling period. The level of the first ramp wave W1 (first reference signal) can increase or decrease for the first sampling period.

In a case in which the pulse output circuit 21 outputs the read pulse for a period from the time t7 to a time t8, the signal charge accumulated in the photoelectric conversion element 22 is transmitted to the FDA 23 and the FDA 23 outputs an analog signal. The analog signal output from the FDA 23 is input to the first sampling circuit 31, the second sampling circuit 32, and the comparison circuit 33 included in the CDS circuit 30. In a case in which the second predetermined period elapses since the output of the reset pulse and a time t9 comes, the ramp wave generation circuit 27 outputs the second ramp wave W2 (second reference signal) and the second ramp wave W2 is input to the comparison circuit 33. The comparison circuit 33 compares the level of the analog signal output from the FDA 23 with the level of the second ramp wave W2. In a case in which the level of the second ramp wave W2 is equal to a second reference level V2 that has been set in advance in the comparison circuit 33 at a time t10, the comparison circuit 33 outputs a second sampling pulse for a period from a time t10 to a time tn. The second sampling pulse is input to the second sampling circuit 32 and the analog signal input to the second sampling circuit 32 is sampled by the second sampling circuit 32. The signal sampled by the second sampling circuit 32 is output as a data signal (second analog signal) from the second sampling circuit 32 and is input to a positive input terminal of the difference circuit 34.

Then, the next horizontal synchronizing signal HD rises at a time t12 and the next reset pulse is output at a time t13. It is assumed that the period from the output of the read pulse to the output of the reset pulse is a second sampling period. The level of the second ramp wave W2 (second reference signal) can increase or decrease for the second sampling period.

The difference circuit 34 outputs, as a video signal, a difference analog signal indicating the difference between the reset signal (first analog signal) obtained by the sampling in the first sampling circuit 31 and the reset signal (second analog signal) obtained by the sampling in the second sampling circuit 32.

Figure 5:
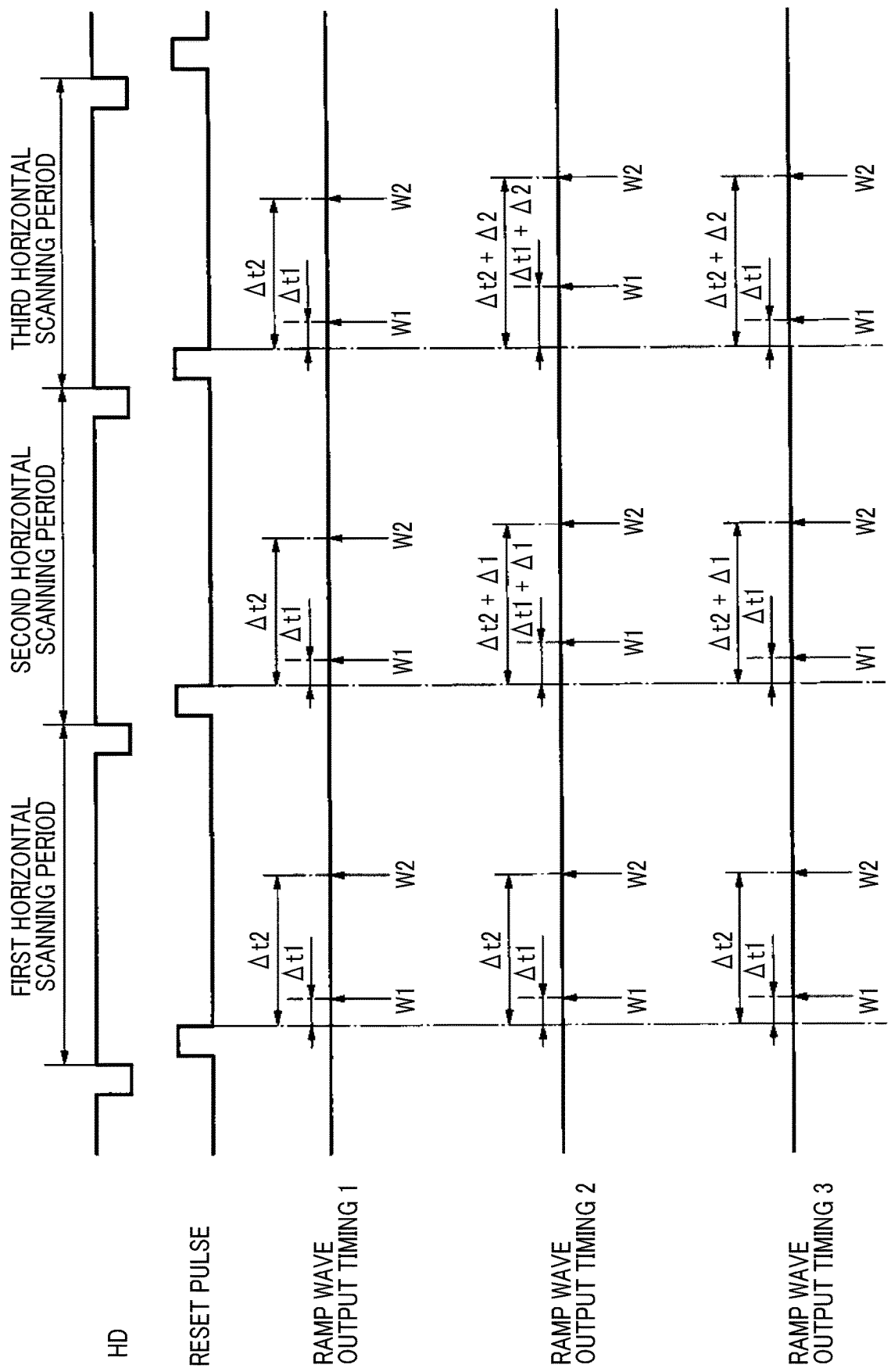

FIG. 5 is a timing chart illustrating the output timing of the horizontal synchronizing signal HD, the reset pulse, and the ramp wave.

As described above, after the periodic horizontal synchronizing signal HD is output, the reset pulse is output.

In FIG. 5, three types of output timing of the ramp wave are illustrated. These types of output timing of the ramp wave are controlled by the control device 11 (sampling control means).

At a first output timing, the first ramp wave W1 starts to be output (the level of the first ramp wave W1 starts to decrease as illustrated in FIG. 4) after a period Δt1 elapses since the output of the reset pulse and the second ramp wave W2 starts to be output (the level of the second ramp wave W2 starts to decrease as illustrated in FIG. 4) after a period Δt2 elapses since the output of the reset pulse.

Figure 17:
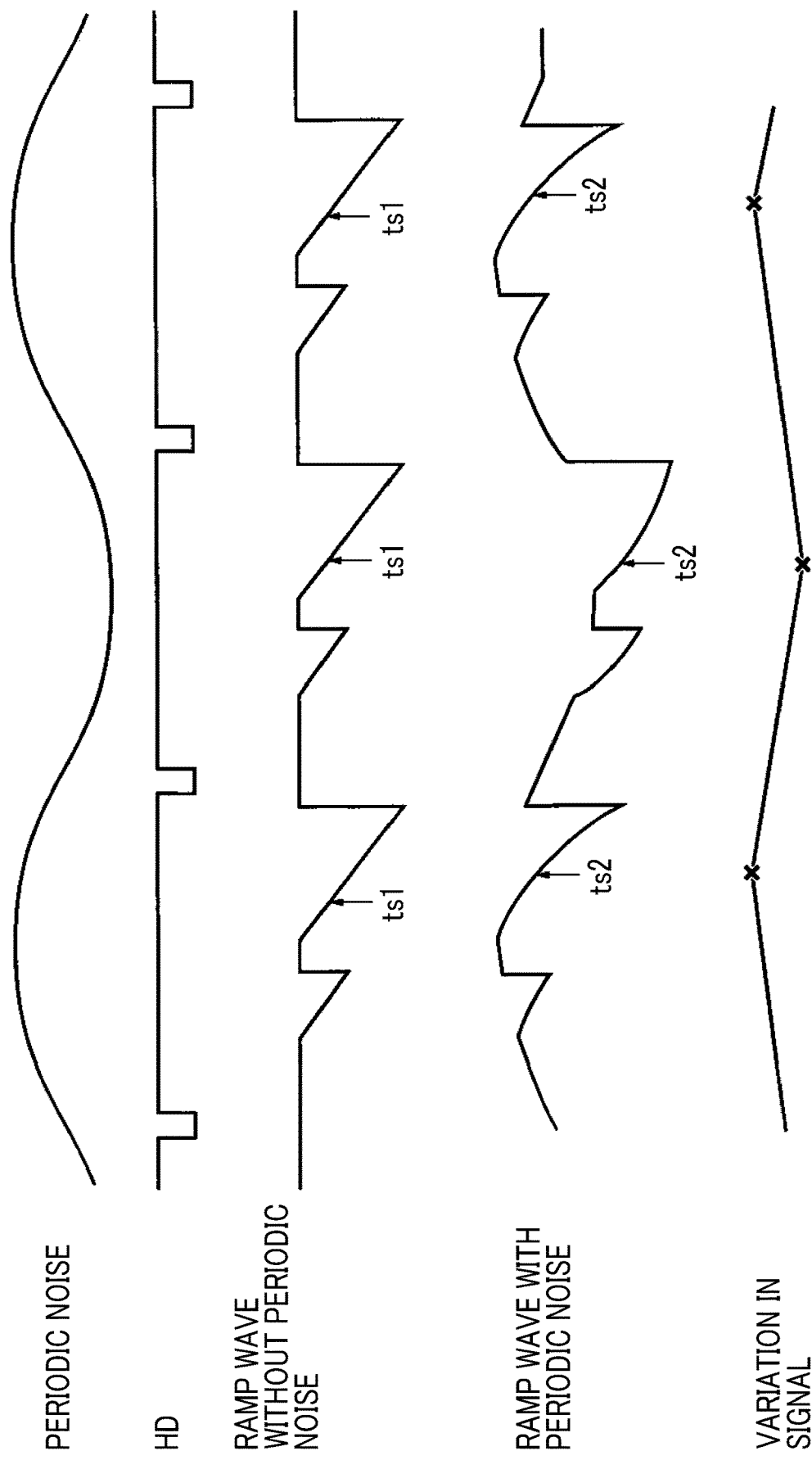
Figure 18:
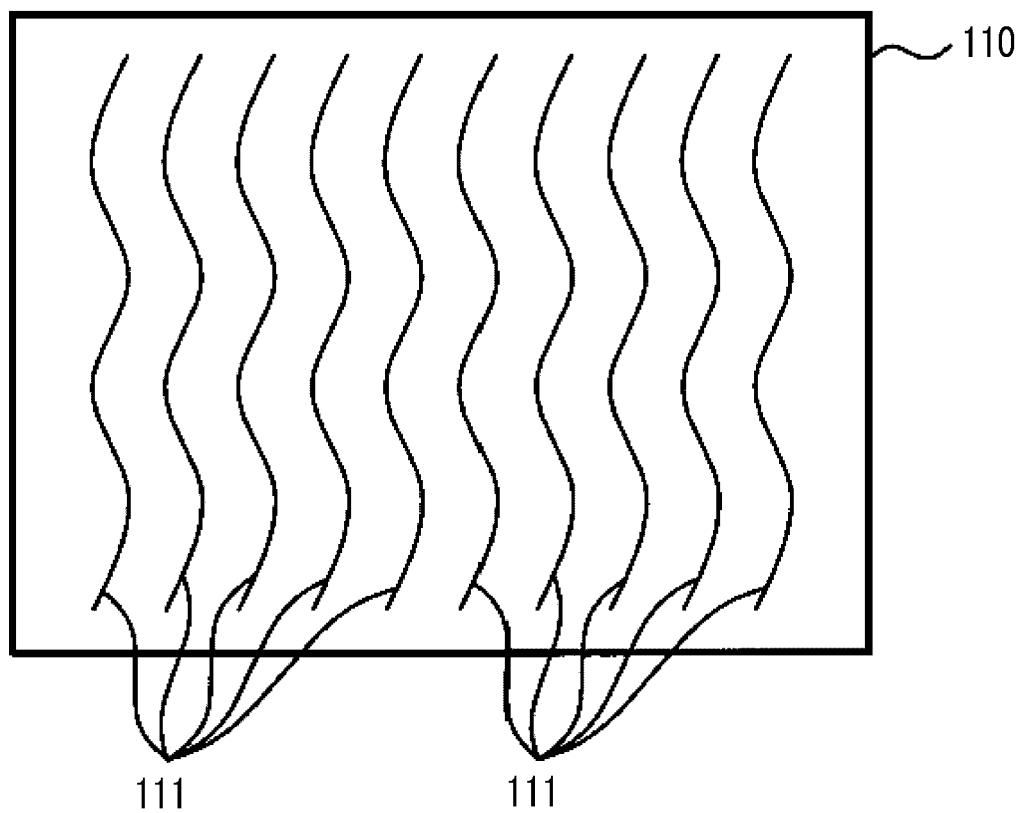
FIG. 18 illustrates an example of an object image in which stripe noise appears.

At the first output timing, in a case in which the output timing of the reset pulse is periodic (the period of the reset pulse is equal to the period of the horizontal synchronizing signal HD), both the output timing of the first ramp wave W1 and the output timing of the second ramp wave W2 are periodic. Therefore, in a case in which periodic noise is present as described with reference to FIG. 17, stripe noise 111 appears in the object image 110 as illustrated in FIG. 18.

In this embodiment, in order to prevent the noise 111, the pulse output circuit 21 non-periodically outputs the reset pulse at the first output timing, which will be described below. In this specification, the term "non-periodic" may be any term different from the term "periodic" indicating that predetermined phenomena (the output of a pulse, the output of a reference signal, and a change in reference level) occur at a predetermined time interval. The reset pulse may be randomly output or may be output such that the same state does not occur two times while one object image is being displayed. The period of the reset pulse may not be equal to the period of the periodic noise.

At a second output timing, the output timing of the first ramp wave W1 is gradually delayed (shifted) for each period of the horizontal synchronizing signal HD. For a first horizontal scanning period (the first horizontal scanning period is the output interval of the horizontal synchronizing signal and a period from the rising edge of the horizontal synchronizing signal to the next rising edge of the horizontal synchronizing signal is referred to as a horizontal scanning period), the first ramp wave W1 starts to be output after the period $\Delta t1$ elapses since the output of the reset pulse and the second ramp wave W2 starts to be output after a period $\Delta t2$ ($\Delta t2$ is longer than $\Delta t1$) elapses since the output of the reset pulse. For a second horizontal scanning period following the first horizontal scanning period, the output timing of the first ramp wave W1 is later than the output timing for the first horizontal scanning period. The first ramp wave W1 starts to be output after a period $\Delta t1+\Delta 1$ elapses since the output of the reset pulse and the second ramp wave W2 starts to be output after a period $\Delta t2+\Delta 1$ elapses since the output of the reset pulse. For a third horizontal scanning period following the second horizontal scanning period, the output timing of the first ramp wave W1 is even later than the output timing for the second horizontal scanning period. The first ramp wave W1 starts to be output after a period $\Delta t1+\Delta 2$ ($\Delta 2$ is longer than $\Delta 1$) elapses since the output of the reset pulse. This holds for the subsequent horizontal scanning periods.

At the second output timing, both the output timing of the first ramp wave W1 and the output timing of the second ramp wave W2 are non-periodic. In a case in which the output timing of the first ramp wave W1 and the output timing of the second ramp wave W2 are non-periodic, both the time when the level of the first ramp wave W1 is equal to the first reference level V1 and the time when the level of the second ramp wave W2 is equal to the second reference level V2 are non-periodic.

Therefore, the control device 11 (sampling control means) performs control such that both the sampling of the reset signal (analog signal) by the first sampling circuit 31 for the first sampling period and the sampling of the data signal (analog signal) by the second sampling circuit 32 for the second sampling period are non-periodic. Even in a case in which the imaging device 2 is affected by the periodic noise and the periodic noise is included in the ramp waves (the first ramp wave W1 and the second ramp wave W2) as described with reference to FIG. 17, the periodic noise is excluded from the video signal output from the difference circuit 34. The generation of the stripe noise 111 in the object image 110 as illustrated in FIG. 18 is prevented.

At a third output timing, the first ramp wave W1 is output after the period $\Delta t1$ elapses since the output of the reset pulse and the output timing of the second ramp wave W2 is gradually delayed (shifted) for each period of the horizontal synchronizing signal HD. For the first horizontal scanning period, the second ramp wave W2 starts to be output after the period $\Delta t2$ elapses since the output of the reset pulse. For the second horizontal scanning period following the first horizontal scanning period, the output timing of the second ramp wave W2 is later than the output timing for the first horizontal scanning period and starts after the period $\Delta t2+\Delta 1$ elapses since the output of the reset pulse. For the third horizontal scanning period following the second horizontal scanning period, the output timing of the second ramp wave W2 is even later than the output timing of the second ramp wave W2 for the second horizontal scanning period and starts after a period $\Delta t2+\Delta 2$ ($\Delta 2$ is longer than $\Delta 1$) elapses since the output of the reset pulse. This holds for the subsequent horizontal scanning periods.

At the third output timing, the output timing of the first ramp wave W1 is periodic and the output timing of the second ramp wave W2 is non-periodic. In a case in which the output timing of the second ramp wave W2 is non-periodic, the time when the level of the second ramp wave W2 is equal to the second reference level V2 is non-periodic.

Therefore, the control device 11 performs control such that the sampling of the reset signal (analog signal) by the first sampling circuit 31 for the first sampling period is periodic and the sampling of the data signal (analog signal) by the second sampling circuit 32 for the second sampling period is non-periodic. The difference circuit 34 represents the video signal as the difference between the data signal obtained by non-periodic sampling and the reset signal obtained by periodic sampling. Therefore, even in a case in which the imaging device 2 is affected by the periodic noise as described with reference to FIG. 17, the periodic noise is excluded from the video signal output from the difference circuit 34. The generation of the stripe noise 111 in the object image 110 as illustrated in FIG. 18 is prevented.

At the third output timing, the output timing of the first ramp wave W1 is periodic and the output timing of the second ramp wave W2 is non-periodic. However, the output timing of the first ramp wave W1 may be non-periodic and the output timing of the second ramp wave W2 may be periodic.

In a case in which at least one of the output timing of the first ramp wave W1 or the output timing of the second ramp wave W2 from the ramp wave generation circuit 27 is non-periodic as at the second output timing or the third output timing, the control device 11 (sampling control means) can perform control such that at least one of the sampling of the reset signal (analog signal) for the first sampling period or the sampling of the data signal (analog signal) for the second sampling period is non-periodic.

At the second output timing, a sampling interval between the sampling of the reset signal for the first sampling period and the sampling of the data signal for the second sampling period is $\Delta t2-\Delta t1$ and is constant. As such, the sampling interval may be constant. At the third output timing, the sampling interval between the sampling of the reset signal for the first sampling period and the sampling of the data signal for the second sampling period varies depending on the period of the horizontal synchronizing signal HD. As such, the sampling interval may vary depending on the period of the horizontal synchronizing signal HD.

Figure 6:
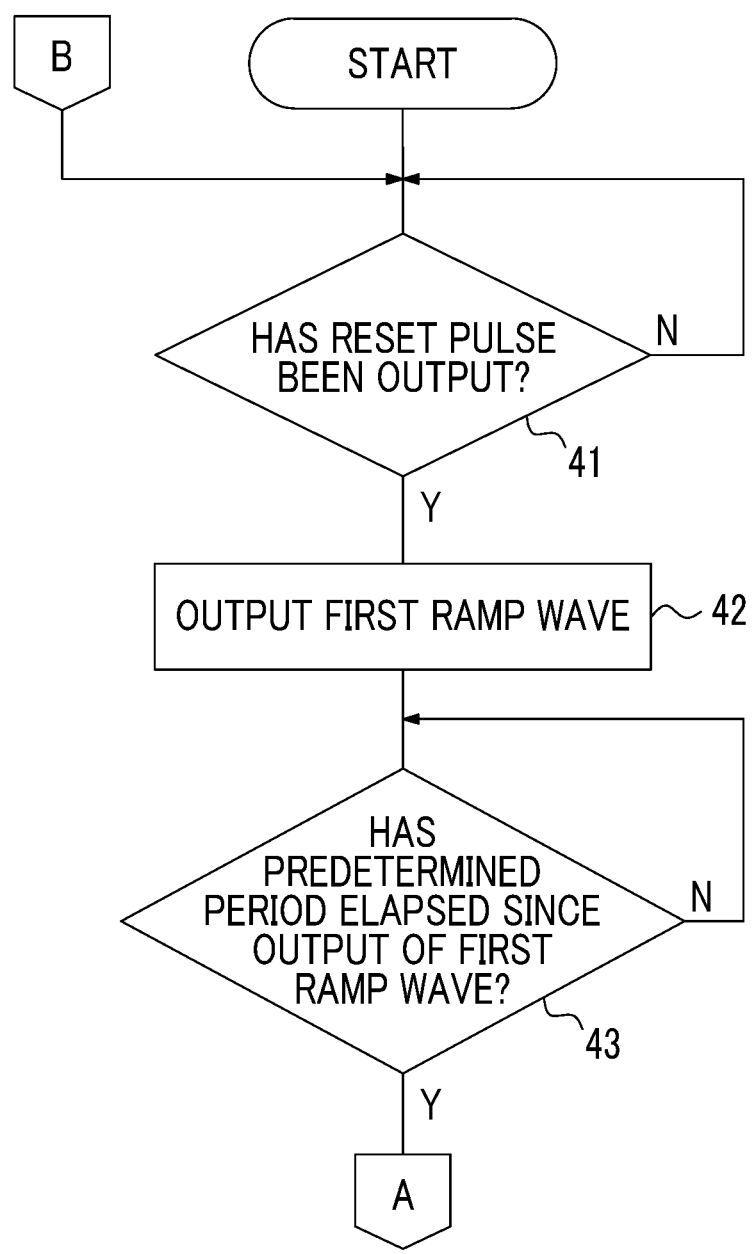
FIG. 6 is a flowchart illustrating a portion of the procedure of a ramp wave output process.
Figure 7:
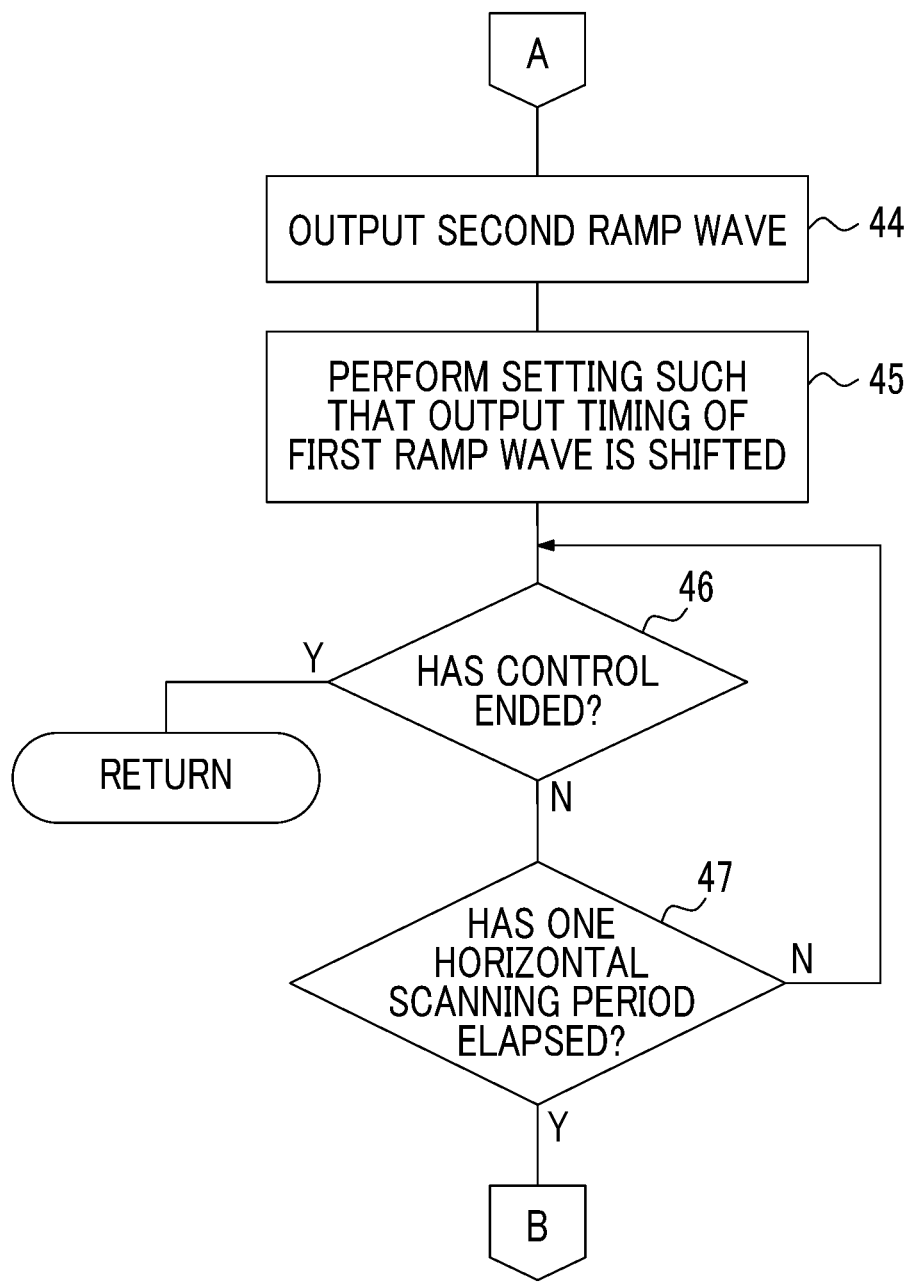
FIG. 7 is a flowchart illustrating a portion of the procedure of the ramp wave output process.

FIGS. 6 and 7 are flowcharts illustrating the procedure of a process for deciding the output timing of the first ramp wave W1 and the output timing of the second ramp wave W2. FIGS. 6 and 7 illustrate the procedure of a process for the second output timing illustrated in FIG. 5.

In a case in which the pulse output circuit 21 outputs the reset pulse (YES in Step 41), the ramp wave generation circuit 27 outputs the first ramp wave W1 whose level decreases gradually after the period $\Delta t1$ elapses since the output of the reset pulse (Step 42). In a case in which the level of the first ramp wave W1 is equal to the first reference level V1, the first sampling circuit 31 samples the analog signal output from the FDA 23 and the reset signal is obtained.

In a case in which a predetermined period (Δt2−Δt1) elapses since the output of the first ramp wave W1 (YES in Step 43), that is, in a case in which the period Δt2 elapses since the output of the reset pulse, the ramp wave generation circuit 27 outputs the second ramp wave W2 (Step 44). In a case in which the level of the second ramp wave W2 is equal to the second reference level V2, the second sampling circuit 32 samples the analog signal output from the FDA 23 and the data signal is obtained.

In a case in which the first ramp wave W1 and the second ramp wave W2 are output, the control device 11 sets the ramp wave generation circuit 27 such that the output timing of the first ramp wave W1 is shifted (Step 45). In a case in which the control of the imaging device 2 does not end (NO in Step 46) and one horizontal scanning period elapses (Step 47), the next horizontal scanning period starts and the pulse output circuit 21 outputs the reset pulse (YES in Step 41). For the next horizontal scanning period, the output timing of the first ramp wave W1 is shifted. In a case in which the first ramp wave W1 and the second ramp wave W2 are output, a process of shifting the output timing of the first ramp wave W1 is performed and the first ramp wave W1 is non-periodically sampled. Since the second ramp wave W2 is output after a predetermined period elapses since the output of the first ramp wave W1, the second ramp wave W2 is also non-periodically output.

Figure 8:
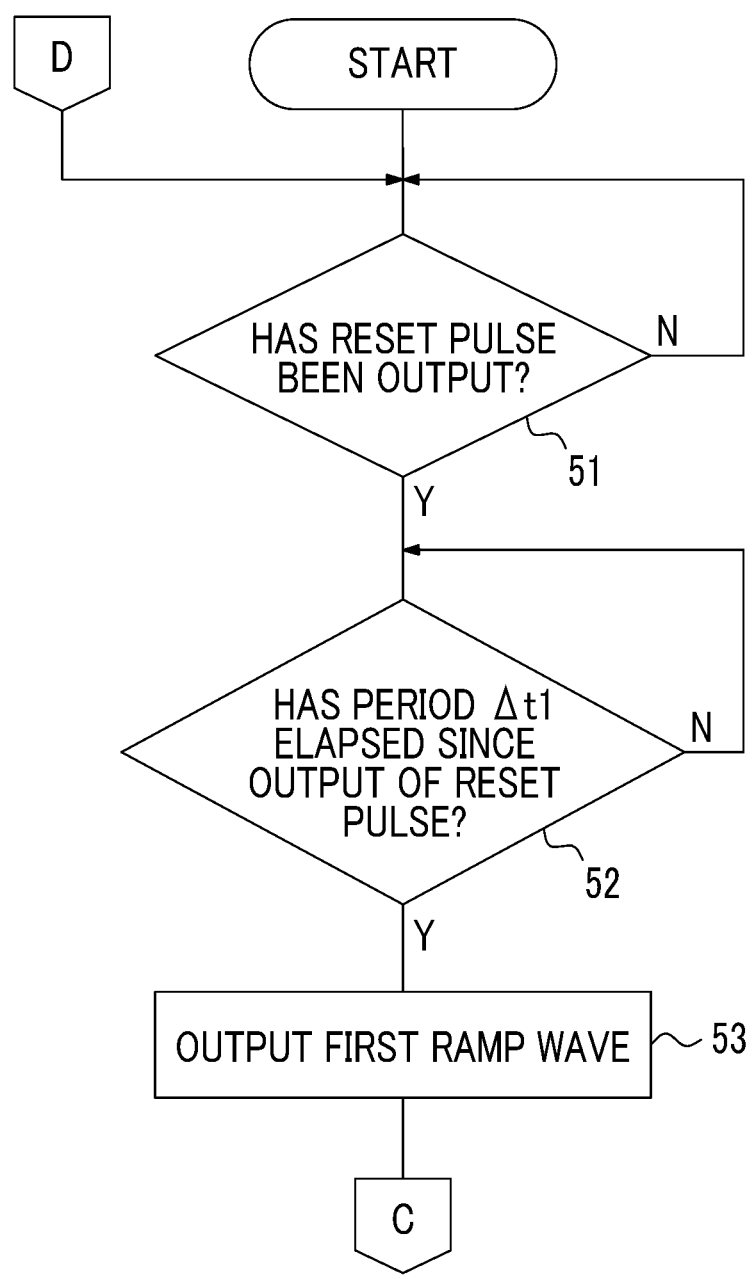
FIG. 8 is a flowchart illustrating a portion of the procedure of the ramp wave output process.
Figure 9:
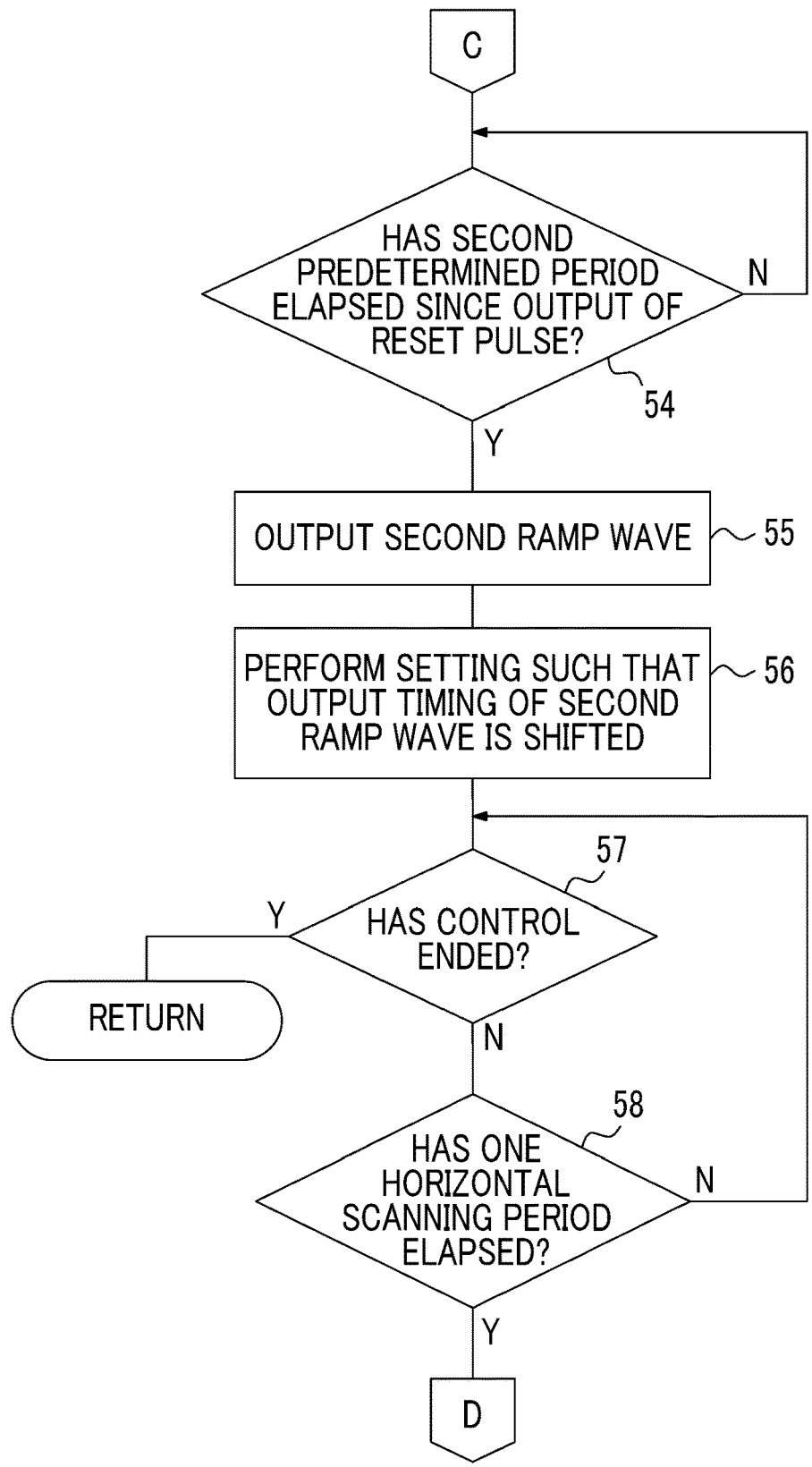
FIG. 9 is a flowchart illustrating a portion of the procedure of the ramp wave output process.

FIGS. 8 and 9 are flowcharts illustrating the procedure of another process for deciding the output timing of the first ramp wave W1 and the output timing of the second ramp wave W2. FIGS. 8 and 9 illustrate the procedure of a process for the third output timing illustrated in FIG. 5.

The pulse output circuit 21 outputs the reset pulse (YES in Step 51). In a case in which the period Δt1 elapses since the output of the reset pulse (YES in Step 52), the pulse output circuit 21 outputs the first ramp wave W1 (Step 53). In a case in which the level of the first ramp wave W1 is equal to the first reference level V1, the first sampling circuit 31 samples the analog signal output from the FDA 23 and the reset signal is obtained.

In a case in which the period Δt2 elapses since the output of the reset pulse (YES in Step 54), the ramp wave generation circuit 27 outputs the second ramp wave W2 (Step 55). In a case in which the level of the second ramp wave W2 is equal to the second reference level V2, the second sampling circuit 32 samples the analog signal output from the FDA 23 and the data signal is obtained.

In a case in which the first ramp wave W1 and the second ramp wave W2 are output, the control device 11 controls the pulse output circuit 21 such that the output timing of the second ramp wave W2 is shifted (delayed) (Step 56). In a case in which the control of the imaging device 2 does not end (NO in Step 57) and one horizontal scanning period elapses (YES in Step 58), the next horizontal scanning period starts and the pulse output circuit 21 outputs the reset pulse (YES in Step 51). In a case in which the period Δt1 elapses since the output of the reset pulse (YES in Step 52), the first ramp wave W1 is output again (Step 53). In a case in which the period Δt2+Δ1 elapses since the output of the reset pulse (Step 54), the second ramp wave W2 is output (Step 55). In a case in which the first ramp wave W1 and the second ramp wave W2 are output, the shift of the period for deciding the output timing of the second ramp wave W2 is repeated. The second ramp wave W2 is non-periodically sampled.

Figure 10:
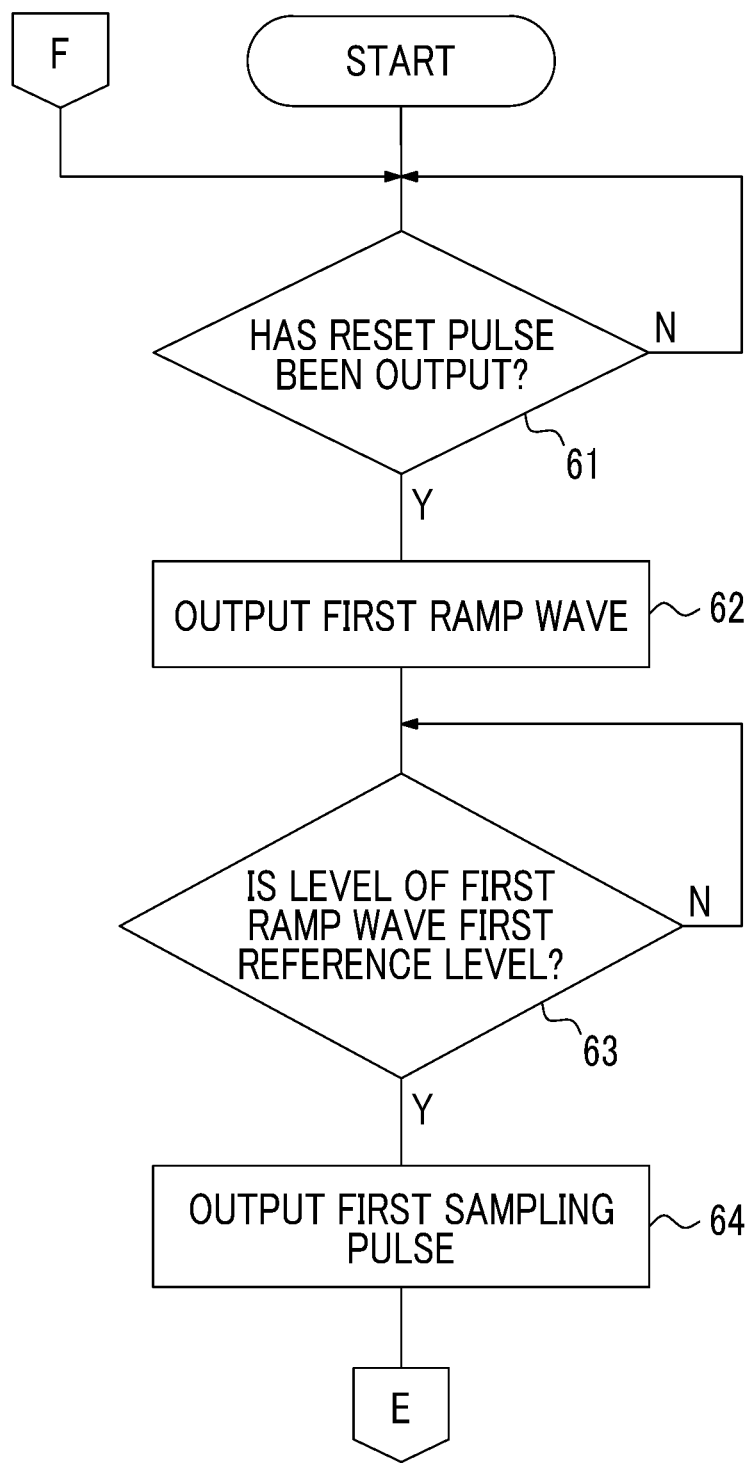
FIG. 10 is a flowchart illustrating a portion of the procedure of a process for changing a first reference level and a second reference level.
Figure 11:
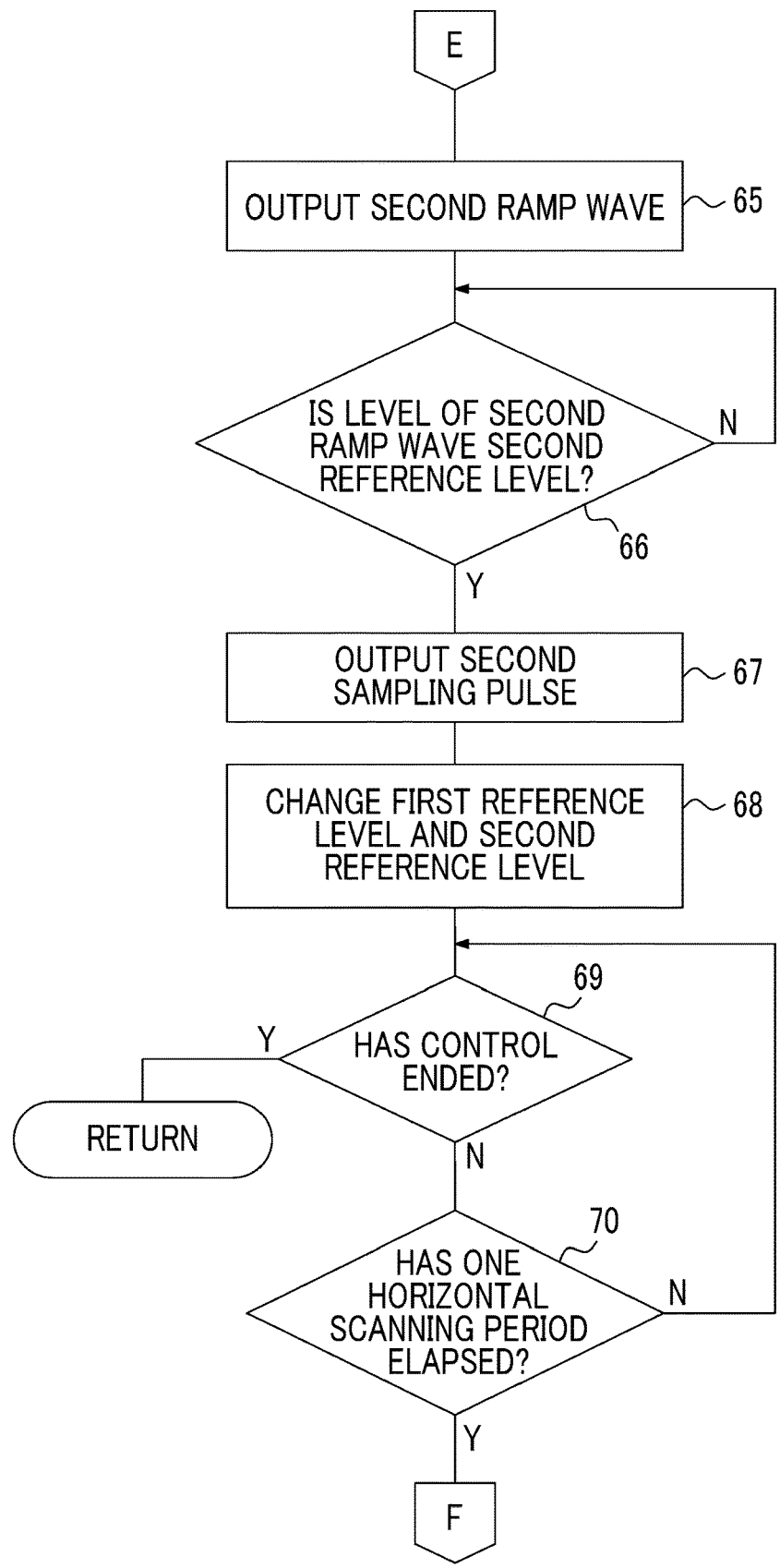
FIG. 11 is a flowchart illustrating a portion of the procedure of the process for changing the first reference level and the second reference level.

FIGS. 10 and 11 are flowcharts illustrating the procedure of a process for changing the first reference level V1 and the second reference level V2.

FIGS. 10 and 11 illustrate the procedure of a process for changing the first reference level V1 used for sampling for the first sampling period and the second reference level V2 used for sampling for the second sampling period depending on the horizontal scanning period such that at least one of sampling for the first sampling period or sampling for the second sampling period is non-periodic.

In a case in which the pulse output circuit 21 outputs the reset pulse (YES in Step 61), the ramp wave generation circuit 27 outputs the first ramp wave W1 after the period Δt1 elapses since the output of the reset pulse (Step 62). In a case in which the level of the first ramp wave W1 is equal to the first reference level V1 (YES in Step 63), the first sampling pulse is input to the first sampling circuit 31. The first sampling circuit 31 samples the analog signal output from the FDA 23 and the reset signal is obtained.

After the period Δt2 elapses since the output of the reset pulse, the ramp wave generation circuit 27 outputs the second ramp wave W2 (Step 65). In a case in which the level of the second ramp wave W2 is equal to the second reference level V2 (YES in Step 66), the second sampling pulse is input to the second sampling circuit 32. The second sampling circuit 32 samples the analog signal output from the FDA 23 and the data signal is obtained.

In a case in which sampling by the first sampling circuit 31 for the first sampling period and sampling by the second sampling circuit 32 for the second sampling period are performed, the control device 11 changes the first reference level V1 and the second reference level V2 set in the comparison circuit 33 included in the CDS circuit 30 (Step 68). Both the first reference level V1 and the second reference level V2 may not be changed and any one of the first reference level V1 and the second reference level V2 may be changed.

In a case in which the control of the imaging device 2 does not end (NO in Step 69) and one horizontal scanning period elapses (YES in Step 70), the next horizontal scanning period starts and the pulse output circuit 21 outputs the reset pulse (YES in Step 61). Then, in a case in which the first ramp wave W1 is output and the level of the output first ramp wave W1 is equal to the first reference level V1 (Step 62 and YES in Step 63), the first sampling circuit 31 performs sampling. In a case in which the second ramp wave W2 is output and the level of the output second ramp wave W2 is equal to the second reference level V2 (Step 65 and YES in Step 66), the second sampling circuit 32 performs sampling. In a case in which sampling by the first sampling circuit 31 and sampling by the second sampling circuit 32 are performed, the first reference level V1 and the second reference level V2 are changed (to values varying depending on the horizontal scanning periods). Therefore, the sampling timing of the first sampling circuit 31 in a case in which the level of the first ramp wave W1 is equal to the first reference level V1 and the sampling timing of the second sampling circuit 32 in a case in which the level of the second ramp wave W2 is equal to the second reference level V2 are non-periodic.

Figure 12:
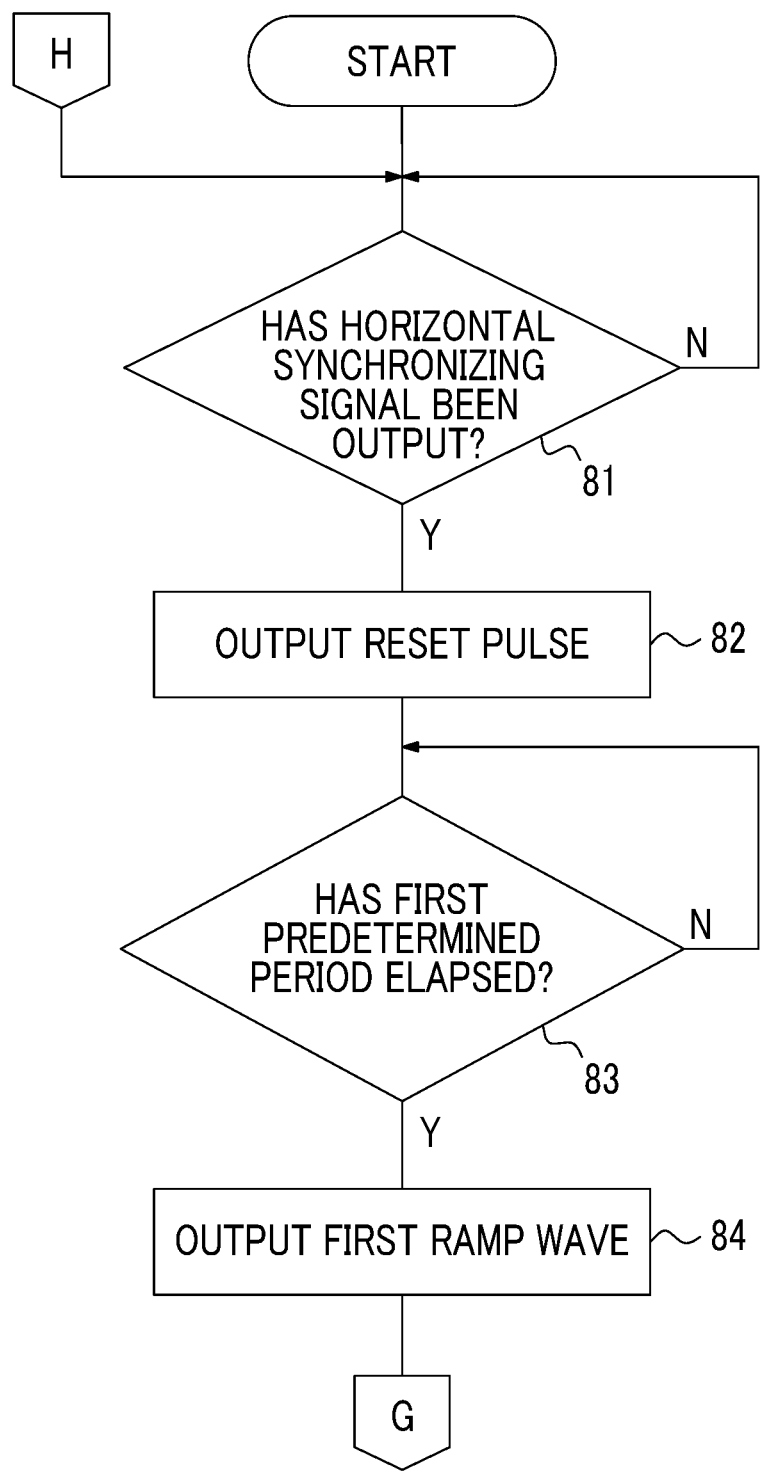
FIG. 12 is a flowchart illustrating the procedure of a process for changing the output timing of a reset pulse.
Figure 13:
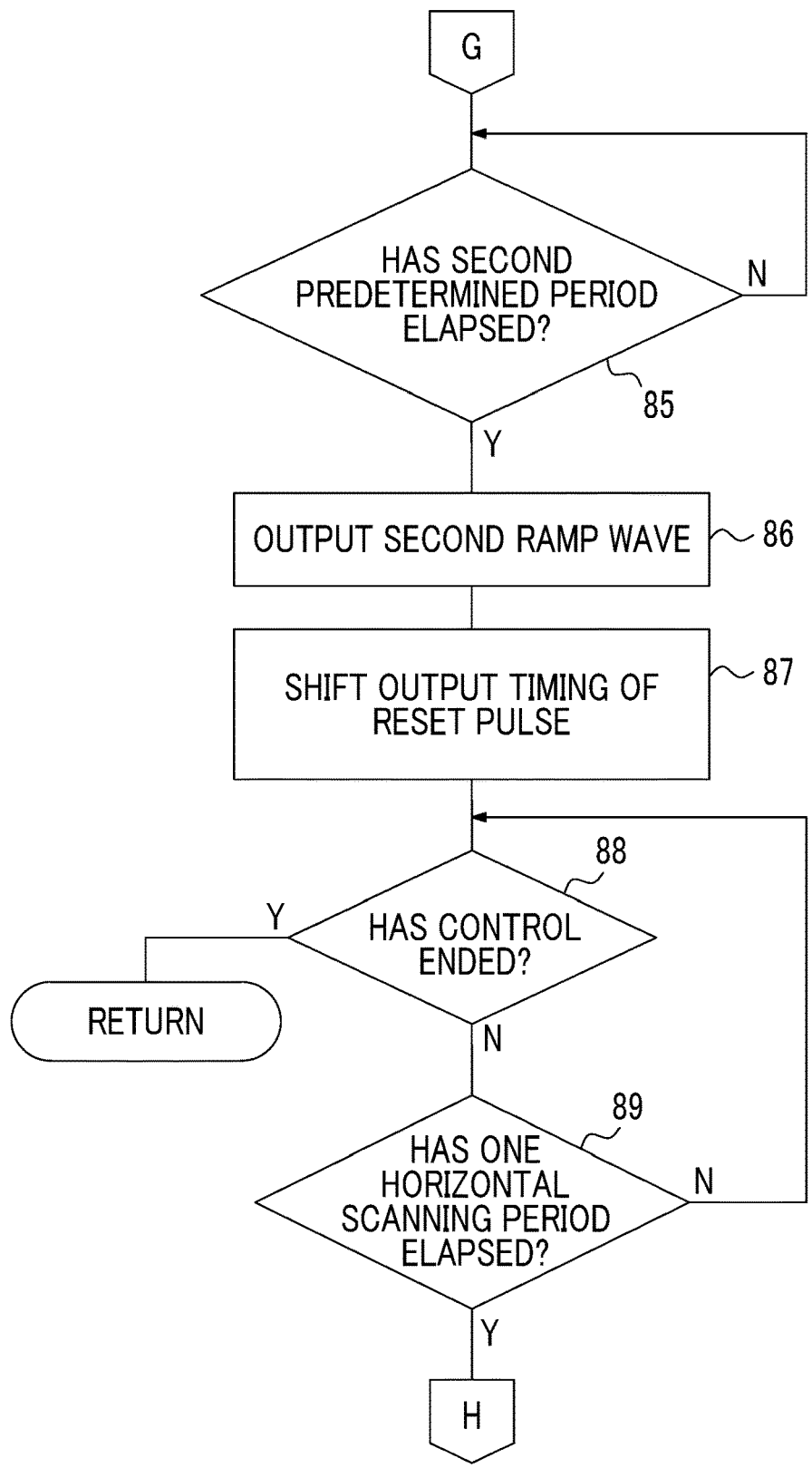
FIG. 13 is a flowchart illustrating the procedure of the process for changing the output timing of the reset pulse.

FIGS. 12 and 13 are flowcharts illustrating the procedure of another process for deciding the output timing of the first ramp wave W1 and the output timing of the second ramp wave W2. FIGS. 12 and 13 illustrate the non-periodic output of the reset pulse in a case in which the first ramp wave W1 and the second ramp wave W2 are output at the first output timing illustrated in FIG. 5.

In a case in which the driving circuit 3 outputs the horizontal synchronizing signal HD (Step 81) and the output horizontal synchronizing signal HD is input to the pulse output circuit 21, the pulse output circuit 21 outputs the reset pulse (Step 82). In a case in which the period Δt1 (first predetermined period) elapses since the output of the reset pulse (YES in Step 83), the ramp wave generation circuit 27 outputs the first ramp wave W1 (Step 84). In a case in which the level of the first ramp wave W1 is equal to the first reference level V1, the first sampling circuit 31 samples the analog signal output from the FDA 23 and the reset signal is obtained.

In a case in which the period Δt2 (second predetermined period) elapses since the output of the reset pulse (YES in Step 85), the ramp wave generation circuit 27 outputs the second ramp wave W2 (Step 86). In a case in which the level of the second ramp wave W2 is equal to the second reference level V2, the second sampling circuit 32 samples the analog signal output from the FDA 23 and the data signal is obtained.

In a case in which the first ramp wave W1 and the second ramp wave W2 are output, the control device 11 performs control such that the output timing of the reset pulse from the pulse output circuit 21 is shifted (delayed) (Step 87). In a case in which the control of the imaging device 2 does not end (NO in Step 88) and one horizontal scanning period elapses (YES in Step 89), the next horizontal synchronizing signal HD is output (YES in Step 81) and the pulse output circuit 21 outputs the reset pulse (Step 82). In a case in which the period Δt1 (first predetermined period) elapses since the output of the reset pulse, the first ramp wave W1 is output. In a case in which the period Δt2 (second predetermined period) elapses since the output of the reset pulse, the second ramp wave W2 is output. In a case in which the first ramp wave W1 and the second ramp wave W2 are output, the output timing of the reset pulse is shifted. Therefore, the output timing of the first ramp wave W1 and the output timing of the second ramp wave W2 are non-periodic and the first ramp wave W1 and the second ramp wave W2 are shifted for each period of the horizontal synchronizing signal HD.

Figure 14:
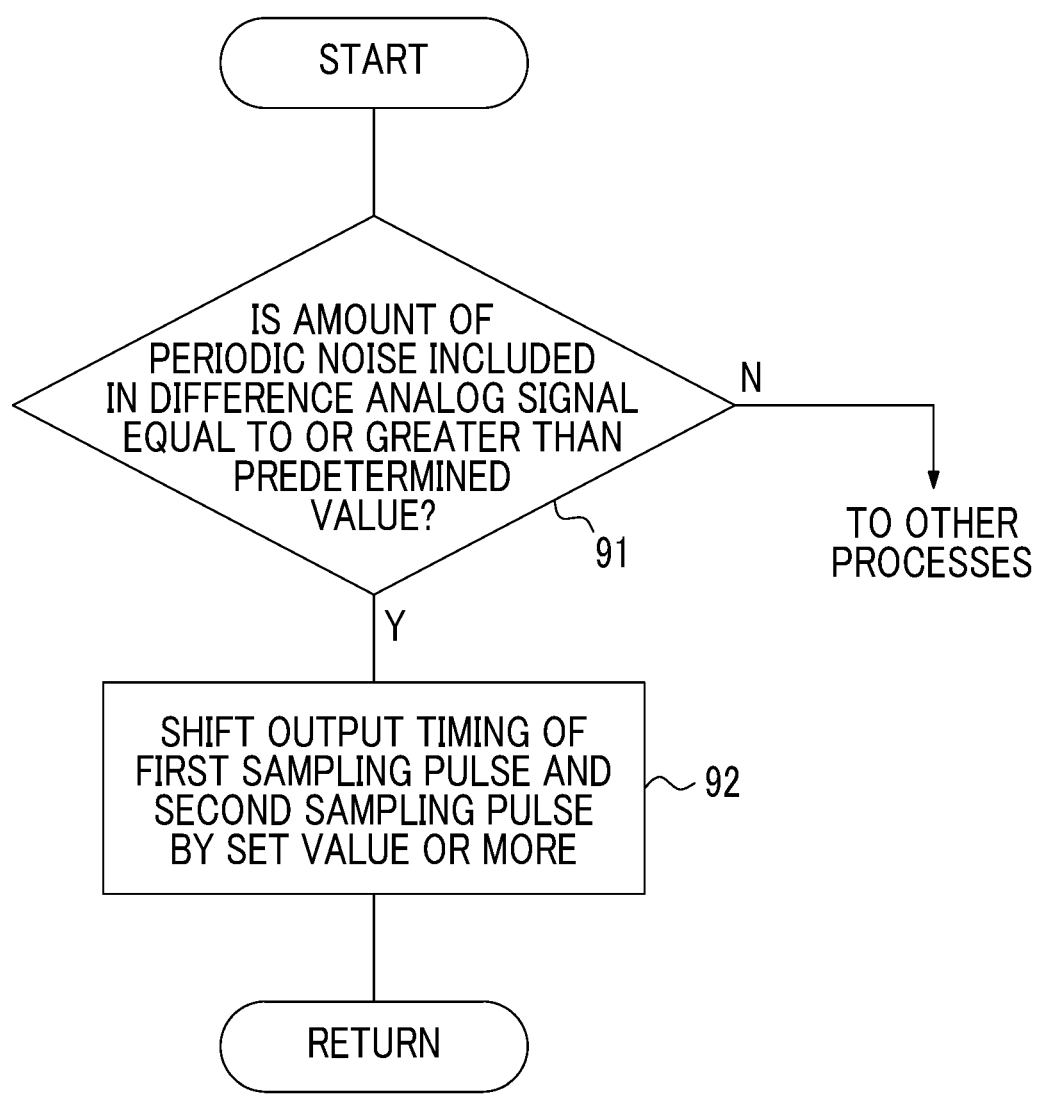
FIG. 14 is a flowchart illustrating the procedure of a process for shifting the output timing of a first sampling pulse and a second sampling pulse.

FIG. 14 is a flowchart illustrating the procedure of a process of the digital camera 1.

The analog/digital conversion circuit 4 converts the difference analog signal output from the difference circuit 34 included in the CDS circuit 30 into digital image data and the digital image data is input to the control device 11 through the signal processing circuit 5. The control device 11 (periodic noise determination means) determines whether the amount of periodic noise included in the input digital image data (difference analog signal) is equal to or greater than a predetermined value (the level of the periodic noise is equal to or greater than a predetermined value) (Step 91).

In a case in which the amount of periodic noise is equal to or greater than the predetermined value (YES in Step 91), it is considered that the influence of the periodic noise on an object image (image) is large. Therefore, at least one of the output timing of the first sampling pulse or the output timing of the second sampling pulse is shifted by a set value or more (Step 92). In a case in which the amount of periodic noise is large and the influence of the periodic noise on the object image is large, at least one of the output timing of the first sampling pulse or the output timing of the second sampling pulse is shifted by the set value or more according to the amount of periodic noise. Therefore, it is possible to reduce the influence of the periodic noise on the object image. Only the output timing of the first sampling pulse may be shifted by the set value or more, only the output timing of the second sampling pulse may be shifted by the set value or more, or both the output timing of the first sampling pulse and the output timing of the second sampling pulse may be shifted by the set value or more. Any one of the methods described with reference to FIGS. 6 to 13 may be used to shift the output timing of the first sampling pulse and the output timing of the second sampling pulse. The set value is the amount of shift of the output timing of the first sampling pulse and the amount of shift of the output timing of the second sampling pulse. In a case in which the amount of periodic noise is equal to or greater than a predetermined value, at least one of the amounts of shift is equal to or greater than the set value. For example, in the case of the first output timing illustrated in FIG. 5, the amount of shift of the reset pulse is the set value. In the case of the second output timing and the third output timing illustrated in FIGS. 5, 41 and 42 are the set value.

In a case in which the amount of periodic noise included in the difference analog signal is not equal to or greater than the predetermined value (NO in Step 91), neither the output timing of the first sampling pulse nor the output timing of the second sampling pulse may be shifted or at least one of the output timing of the first sampling pulse or the output timing of the second sampling pulse may be shifted by a value less than the set value.

Figure 15:
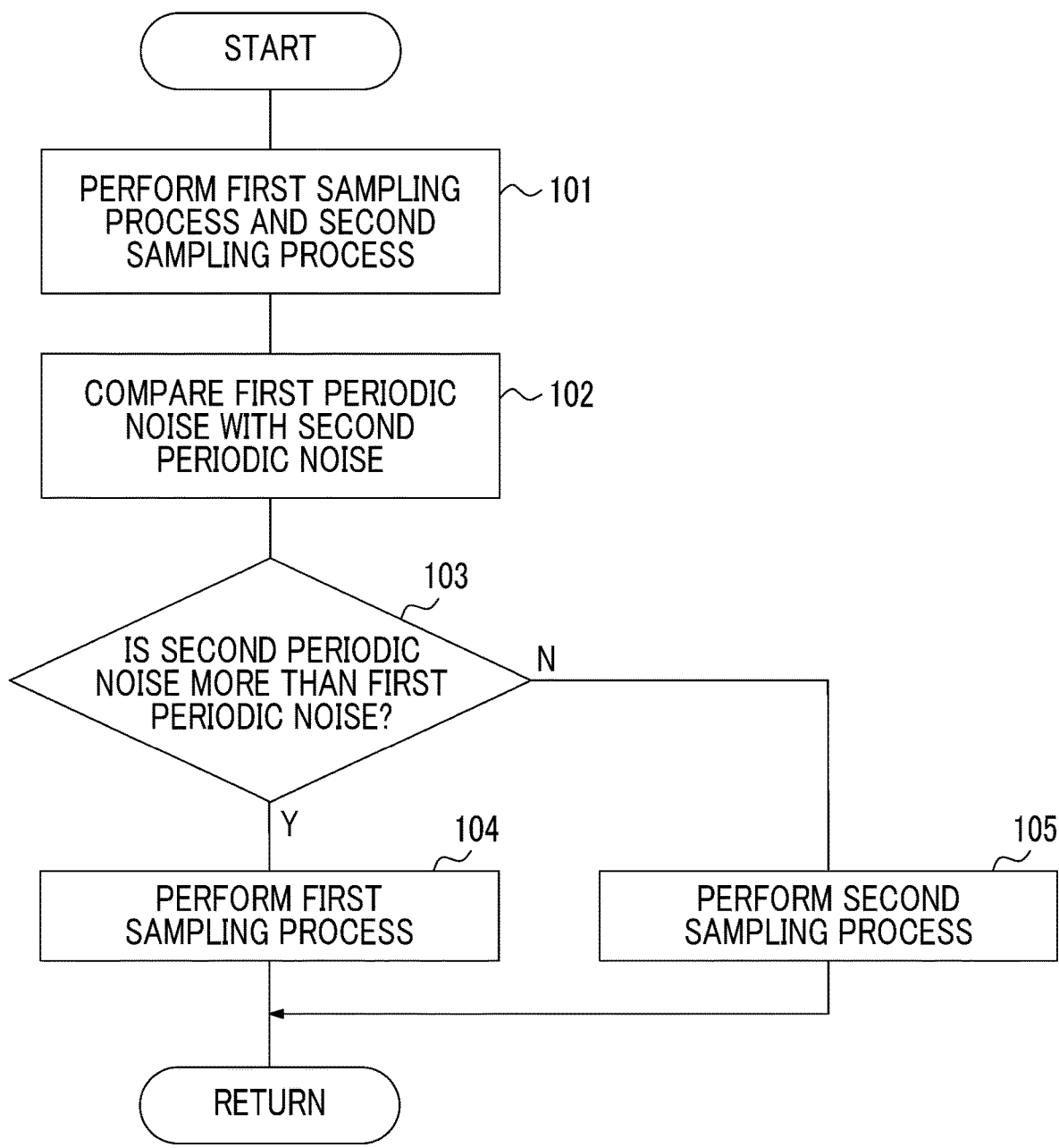
FIG. 15 is a flowchart illustrating the procedure of a process for deciding a first sampling process or a second sampling process.

FIG. 15 is a flowchart illustrating the procedure of another process of the digital camera 1.

In the process illustrated in FIG. 15, a first sampling process and a second sampling process are performed (Step 101). In the first sampling process, as illustrated in FIGS. 6 and 7, FIGS. 8 and 9, or FIGS. 12 and 13, at least one of the output timing of the first ramp wave W1 or the output timing of the second ramp wave W2 is non-periodic such that at least one of the sampling of an analog signal for the first sampling period or the sampling of an analog signal for the second sampling period is non-periodic. In the second sampling process, as illustrated in FIGS. 10 and 11, at least one of the first reference level V1 or the second reference level V2 is changed to be non-periodic such that at least one of the sampling of an analog signal for the first sampling period or the sampling of an analog signal for the second sampling period is non-periodic.

The control device 11 detects first periodic noise that is included in the object image indicated by the difference analog signal output from the difference circuit 34 in a case in which the first sampling process is performed and second periodic noise that is included in the object image indicated by the difference analog signal output from the difference circuit 34 in a case in which the second sampling process is performed and the first periodic noise and the second periodic noise are compared by the control device 11 (comparison means) (Step 102).

In a case in which the comparison result shows that the second periodic noise is more than the first periodic noise (YES in Step 103), it is considered that the first sampling process rather than the second sampling process can remove the periodic noise. Therefore, the CDS circuit 30 is controlled by the control device 11 (control means) such that the first sampling process is performed (Step 104).

In a case in which the first periodic noise is more than the second periodic noise (NO in Step 103), it is considered that the second sampling process rather than the first sampling process can remove the periodic noise. Therefore, the CDS circuit 30 is controlled by the control device 11 (control means) such that the second sampling process is performed (Step 105).

A sampling process of a method that can remove a larger amount of periodic noise is performed.

Figure 16:
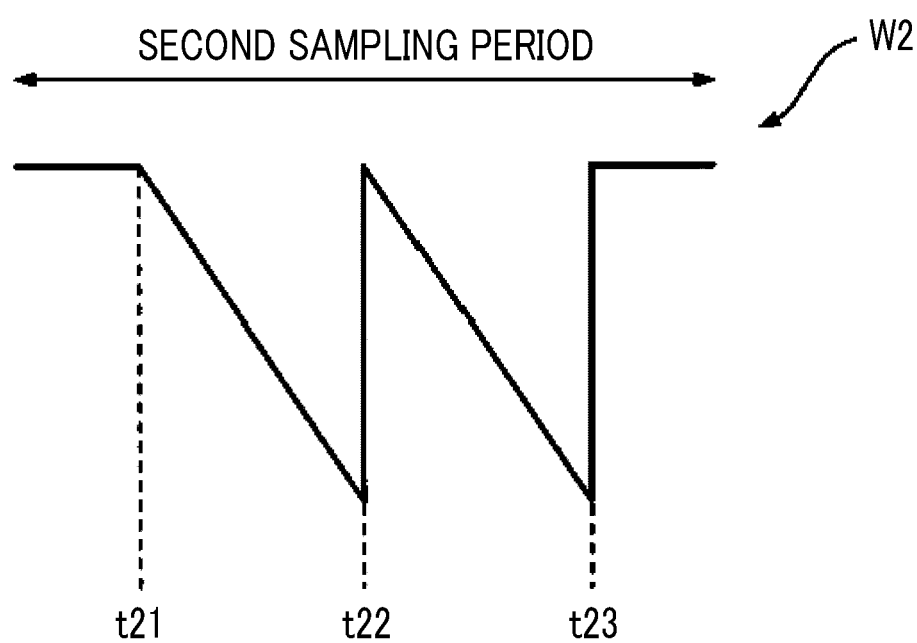
FIG. 16 illustrates an example of a second ramp wave.

FIG. 16 illustrates another example of the second ramp wave W2.

The level of the second ramp wave W2 illustrated in FIG. 4 decreases for the second sampling period. In contrast, the level of the second ramp wave W2 illustrated in FIG. 16 decreases between a time t21 and a time t22, is reset at the time t22 (increases to a predetermined level), and decreases again between the time t22 and a time t23 for the second sampling period. As such, a decrease in the level of the second ramp wave W2 for the second sampling period may be repeated.

The level of the second ramp wave W2 illustrated in FIG. 4 decreases for the second sampling period. However, the level of the second ramp wave W2 may not decrease, but may increase. The decrease in the level of the second ramp wave W2 illustrated in FIG. 16 is not repeated for the second sampling period, but an increase in the level of the second ramp wave W2 may be repeated (an increase or decrease in the level may be repeated).

The level of the first ramp wave W1 illustrated in FIG. 4 decreases for the first sampling period. However, the level of the first ramp wave W1 may not decrease, but may increase. In addition, a decrease (or an increase) in the level of the first ramp wave W1 illustrated in FIG. 4 may be repeated, similarly to the second ramp wave W2 illustrated in FIG. 16.

What is claimed is:

1. A solid-state electronic imaging device comprising:
   a plurality of photoelectric conversion elements that are arranged in a row direction and a column direction;
   a pulse output circuit that outputs a reset pulse for resetting signal charge accumulated in the photoelectric conversion elements after a periodic horizontal synchronizing signal is output and outputs a read pulse for reading the signal charge accumulated in the photoelectric conversion elements;
   an amplification circuit that converts the signal charge accumulated in the photoelectric conversion elements into an analog signal and outputs the analog signal, in response to the output of the read pulse from the pulse output circuit;
   a reference signal output circuit that outputs a first reference signal whose level increases or decreases for a first sampling period from the output of the reset pulse from the pulse output circuit to the output of the read pulse from the pulse output circuit and outputs a second reference signal whose level increases or decreases for a second sampling period from the output of the read pulse from the pulse output circuit to the output of the reset pulse from the pulse output circuit;
   a first sampling circuit that samples the analog signal output from the amplification circuit in a case in which the level of the first reference signal output from the reference signal output circuit is a first reference level;
   a second sampling circuit that samples the analog signal output from the amplification circuit in a case in which the level of the second reference signal output from the reference signal output circuit is a second reference level; and
   a sampling control device for making at least one of the sampling of the analog signal by the first sampling circuit for the first sampling period or the sampling of the analog signal by the second sampling circuit for the second sampling period non-periodic.

2. The solid-state electronic imaging device according to claim 1,
   wherein the sampling control device makes at least one of an output timing of the first reference signal from the reference signal output circuit or an output timing of the second reference signal from the reference signal output circuit non-periodic such that at least one of the sampling of the analog signal for the first sampling period or the sampling of the analog signal for the second sampling period is non-periodic.

3. The solid-state electronic imaging device according to claim 1,
   wherein the sampling control device non-periodically changes at least one of the first reference level or the second reference level such that at least one of the sampling of the analog signal for the first sampling period or the sampling of the analog signal for the second sampling period is non-periodic.

4. The solid-state electronic imaging device according to claim 1,
   wherein a sampling interval between the sampling of the analog signal for the first sampling period and the sampling of the analog signal for the second sampling period is constant.

5. The solid-state electronic imaging device according to claim 1,
   wherein a sampling interval between the sampling of the analog signal for the first sampling period and the sampling of the analog signal for the second sampling period varies depending on a period of the horizontal synchronizing signal.

6. The solid-state electronic imaging device according to claim 1, further comprising:
   a difference circuit that outputs a difference analog signal indicating a difference between a first analog signal obtained by the sampling in the first sampling circuit and a second analog signal obtained by the sampling in the second sampling circuit.

7. The solid-state electronic imaging device according to claim 6, further comprising:
   a comparison device for comparing first periodic noise that is included in an object image indicated by a difference analog signal output from the difference circuit in a case a first sampling process that makes at least one of the output timing of the first reference signal from the reference signal output circuit or the output timing of the second reference signal from the reference signal output circuit non-periodic such that at least one of the sampling of the analog signal for the first sampling period or the sampling of the analog signal for the second sampling period is non-periodic with second periodic noise that is included in an object image indicated by a difference analog signal output from the difference circuit in a case a second sampling process that non-periodically changes at least one of the first reference level or the second reference level such that at least one of the sampling of the analog signal for the first sampling period or the sampling of the analog signal for the second sampling period is non-periodic; and
   a control device for directing the sampling control device to perform the first sampling process in a case in which the comparison device determines that the second periodic noise is more than the first periodic noise and directing the sampling control device to perform the second sampling process in a case in which the comparison device determines that the first periodic noise is more than the second periodic noise.

8. The solid-state electronic imaging device according to claim 1, further comprising:
   a periodic noise determination device for determining whether an amount of periodic noise included in an object image that is indicated by the difference analog signal output from the difference circuit is equal to or greater than a predetermined value,
   wherein, in a case in which the periodic noise determination device determines that the amount of periodic noise included in the object image is equal to or greater than the predetermined value, the sampling control device shifts at least one of an amount of shift from an output timing of the horizontal synchronizing signal to the sampling of the analog signal for the first sampling period or an amount of shift from the output timing of the horizontal synchronizing signal to the sampling of the analog signal for the second sampling period by a set value or more.

9. The solid-state electronic imaging device according to claim 1, further comprising:
   a driving circuit that generates the horizontal synchronizing signal and outputs the horizontal synchronizing signal to the pulse output circuit.

10. The solid-state electronic imaging device according to claim 1,
    wherein an increase or decrease in the first reference signal is repeated for the first sampling period.

11. The solid-state electronic imaging device according to claim 1,
    wherein an increase or decrease in the second reference signal is repeated for the second sampling period.

12. The solid-state electronic imaging device according to claim 1,
    wherein the first reference signal is output after a first predetermined period elapses since the output of the reset pulse and the second reference signal is output after a second predetermined period elapses since the output of the reset pulse, and
    the sampling control device makes the output timing of the reset pulse from the pulse output circuit non-periodic.

13. A method for controlling a solid-state electronic imaging device, the method comprising:
    allowing a pulse output circuit to output a reset pulse for resetting signal charge accumulated in a plurality of photoelectric conversion elements that are arranged in a row direction and a column direction after a periodic horizontal synchronizing signal is output and to output a read pulse for reading the signal charge accumulated in the photoelectric conversion elements;
    allowing an amplification circuit to convert the signal charge accumulated in the photoelectric conversion elements into an analog signal and to output the analog signal, with the output of the read pulse from the pulse output circuit;
    allowing a reference signal output circuit to output a first reference signal whose level increases or decreases for a first sampling period from the output of the reset pulse from the pulse output circuit to the output of the read pulse from the pulse output circuit and to output a second reference signal whose level increases or decreases for a second sampling period from the output of the read pulse from the pulse output circuit to the output of the reset pulse from the pulse output circuit;
    allowing a first sampling circuit to sample the analog signal output from the amplification circuit in a case in which the level of the first reference signal output from the reference signal output circuit is a first reference level;
    allowing a second sampling circuit to sample the analog signal output from the amplification circuit in a case in which the level of the second reference signal output from the reference signal output circuit is a second reference level; and
    allowing a sampling control device to make at least one of the sampling of the analog signal by the first sampling circuit for the first sampling period or the sampling of the analog signal by the second sampling circuit for the second sampling period non-periodic.

* * * * *